US008917041B2

(12) United States Patent
Kishimoto et al.

(10) Patent No.: US 8,917,041 B2
(45) Date of Patent: Dec. 23, 2014

(54) PHASE-SHIFT DETECTION DEVICE, MOTOR DRIVE DEVICE, BRUSHLESS MOTOR, AND PHASE-SHIFT DETECTION METHOD

(75) Inventors: Kenichi Kishimoto, Osaka (JP); Mineaki Isoda, Osaka (JP); Daisuke Sato, Osaka (JP); Ryuta Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 13/808,874

(22) PCT Filed: Jun. 30, 2011

(86) PCT No.: PCT/JP2011/003747
§ 371 (c)(1),
(2), (4) Date: Jan. 7, 2013

(87) PCT Pub. No.: WO2012/008107
PCT Pub. Date: Jan. 19, 2012

(65) Prior Publication Data
US 2013/0113400 A1     May 9, 2013

(30) Foreign Application Priority Data

Jul. 12, 2010   (JP) ................................. 2010-157456

(51) Int. Cl.
*H02P 23/12*     (2006.01)
(52) U.S. Cl.
USPC ................. 318/400.14; 318/400.26; 318/701; 318/727
(58) Field of Classification Search
USPC ......... 318/400.1, 400.14, 139, 701, 721, 727, 318/400.26; 323/267
See application file for complete search history.

(56) References Cited

U.S. PATENT DOCUMENTS

| | | | | |
|---|---|---|---|---|
| 3,581,077 A | * | 5/1971 | Damewood et al. | 703/9 |
| 4,213,517 A | * | 7/1980 | Ando | 187/296 |
| 4,359,678 A | * | 11/1982 | Raivola et al. | 323/211 |
| 4,591,795 A | * | 5/1986 | McCorkle | 327/104 |
| 4,876,637 A | * | 10/1989 | Mose et al. | 363/37 |
| 4,931,715 A | * | 6/1990 | Lee et al. | 318/709 |

(Continued)

FOREIGN PATENT DOCUMENTS

| | | |
|---|---|---|
| JP | 2005-039991 A | 2/2005 |
| JP | 2005-110453 A | 4/2005 |

(Continued)

OTHER PUBLICATIONS

International Search Report for International Application No. PCT/JP2011/003747, dated Sep. 20, 2011, 2 pages.

*Primary Examiner* — Paul Ip
(74) *Attorney, Agent, or Firm* — Brinks Gilson & Lione

(57) ABSTRACT

A phase-shift detection circuit detects a phase shift in motor driving, using pulse-shaped position detection signal Rd and measurement signal Ms. The position detection signal is based on sensor signal Hs from a position sensor disposed in a motor. The measurement signal is based on the induced voltage from windings. The phase-shift detection circuit includes a level difference calculator and a phase-shift calculator. The level difference calculator calculates a level difference between the level of measurement signal Ms at a rising timing of position detection signal Rd and the level of measurement signal Ms at a falling timing thereof. The phase-shift calculator calculates the amount of phase shifts based on the level difference.

23 Claims, 20 Drawing Sheets

(56) References Cited

U.S. PATENT DOCUMENTS

| | | | |
|---|---|---|---|
| 5,013,982 A * | 5/1991 | Sasaki | 318/114 |
| 5,229,693 A * | 7/1993 | Futami et al. | 318/400.14 |
| 5,473,497 A * | 12/1995 | Beatty | 361/23 |
| 5,537,122 A * | 7/1996 | Eguchi | 342/359 |
| 5,563,478 A * | 10/1996 | Suganuma | 318/116 |
| 6,208,108 B1 * | 3/2001 | Nashiki et al. | 318/701 |
| 6,324,085 B2 * | 11/2001 | Kimura et al. | 363/132 |
| 6,324,142 B1 * | 11/2001 | Ishitoya et al. | 369/59.23 |
| 6,555,988 B2 * | 4/2003 | Masaki et al. | 318/721 |
| 6,566,862 B1 * | 5/2003 | Goto et al. | 324/207.16 |
| 6,639,378 B2 * | 10/2003 | Turner et al. | 318/701 |
| 6,647,325 B2 * | 11/2003 | Shimazaki et al. | 701/22 |
| 6,724,708 B2 * | 4/2004 | Ishibashi et al. | 369/59.25 |
| 6,774,591 B2 * | 8/2004 | Arimitsu et al. | 318/154 |
| 6,891,342 B2 * | 5/2005 | Nakamura et al. | 318/77 |
| 6,914,409 B2 * | 7/2005 | Nukushina | 318/800 |
| 7,402,975 B2 * | 7/2008 | Takata et al. | 318/727 |
| 7,423,396 B2 | 9/2008 | Bolt | |
| 7,450,333 B2 * | 11/2008 | Hirano et al. | 360/75 |
| 7,521,882 B2 * | 4/2009 | Chiu et al. | 318/139 |
| 7,622,873 B2 * | 11/2009 | Takata et al. | 318/362 |
| 7,659,686 B2 * | 2/2010 | Osada et al. | 318/771 |
| 7,847,498 B2 * | 12/2010 | Shibuya | 318/400.01 |
| 8,378,619 B2 * | 2/2013 | Hancock et al. | 318/786 |
| 8,558,488 B2 * | 10/2013 | Murakami | 318/114 |
| 8,660,743 B2 * | 2/2014 | Aoki | 701/34.4 |
| 2001/0002784 A1 * | 6/2001 | Masaki et al. | 318/727 |
| 2001/0015904 A1 * | 8/2001 | Kimura et al. | 363/131 |
| 2004/0027105 A1 * | 2/2004 | Nakamura et al. | 323/267 |
| 2004/0263104 A1 | 12/2004 | Iwanaga et al. | |
| 2007/0132423 A1 | 6/2007 | Ajima et al. | |
| 2007/0147805 A1 * | 6/2007 | Chiu et al. | 388/806 |
| 2010/0045219 A1 | 2/2010 | Ajima et al. | |
| 2011/0001450 A1 * | 1/2011 | Hancock et al. | 318/785 |
| 2011/0068718 A1 * | 3/2011 | Murakami | 318/116 |
| 2014/0009846 A1 * | 1/2014 | Murakami | 359/824 |
| 2014/0145658 A1 * | 5/2014 | Heo et al. | 318/400.26 |

FOREIGN PATENT DOCUMENTS

| | | |
|---|---|---|
| JP | 2007-166735 A | 6/2007 |
| JP | 4191172 B2 | 12/2008 |
| JP | 2009-240041 A | 10/2009 |
| JP | 2010-063291 A | 3/2010 |

* cited by examiner

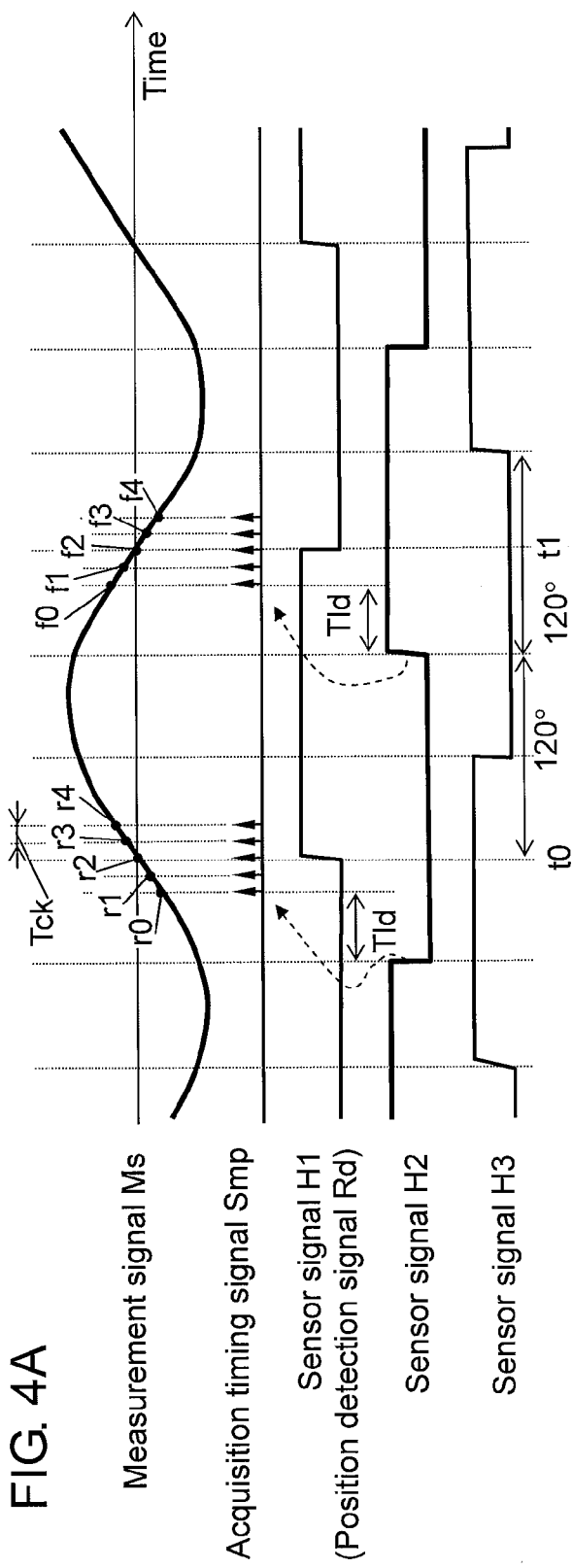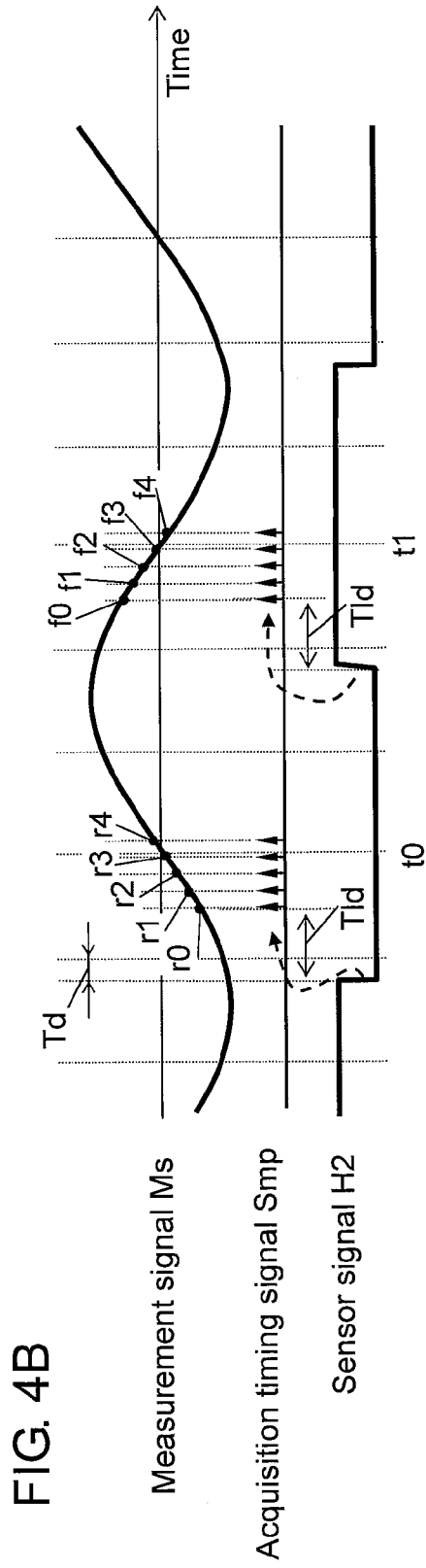

PHASE-SHIFT DETECTION DEVICE, MOTOR DRIVE DEVICE, BRUSHLESS MOTOR, AND PHASE-SHIFT DETECTION METHOD

This application is a 371 application of PCT/JP2011/003747 having an international filing date of Jun. 30, 2011, which claims priority to JP2010-157456 filed Jul. 12, 2010, the entire contents of which are incorporated herein by reference.

TECHNICAL FIELD

The present invention relates to a phase-shift detection device for detecting a phase shift in motor driving based on misalignment of a magnetic pole position sensor disposed in a motor, a motor drive device and a brushless motor that include the phase-sift detection device, and a phase-shift detection method.

BACKGROUND ART

A method for detecting a phase shift in motor driving and a motor using the method as described above are conventionally disclosed in Patent Literature 1, for example. In a brushless motor that includes magnetic pole position sensors for detecting a rotation position of the rotor, for example, the misaligned mounting position of a magnetic pole position sensor causes an error in the detection position. Such an error in the detection position hinders precise rotation control of the brushless motor, thus reducing the rotation efficiency, for example.

To address this problem, the method disclosed in Patent Literature 1 determines an error in the alignment of a magnetic pole position sensor by calculating a phase difference between a sensor signal from the magnetic pole position sensor and a back EMF signal including a local minimum value from the motor drive circuit. That is, first, a brushless motor is coasted in the state where the motor driving is stopped. Next, during this coasting period, a sensor signal and a back EMF signal are measured. Then, the phase of the local minimum value of the back EMF signal and the phase of the pulse changing point of the sensor signal are obtained, and an error in alignment is determined based on the difference between these phases. Further, by correcting the sensor signals based on accumulation of these phase differences, the detection position in the rotor is corrected.

Another method is proposed so as to correct the energization timing by detecting the amount of phase shifts from the ideal position, using a comparator (see Patent Literature 2, for example). That is, the technique disclosed in Patent Literature 2 detects the induced voltage in the W phase using the comparator, and detects the phase difference between the output signal from the comparator and the detection signal from a Hall element in the U phase.

In the conventional method disclosed in Patent Literature 1, the phase of the local minimum value of the back EMF signal needs to be obtained. However, such a local minimum value changes depending on the amplitude of the back EMF signal, and the difference between the peak value of the back EMF signal waveform and the local minimum value is small. This poses a limitation in accurately determining the phase of the local minimum value in a simple manner.

In the method disclosed in Patent Literature 2, in the process of converting the induced voltage into pulses, a delay caused by hysteresis of the comparator makes an error in detection of the phase. Further, because the time delayed by the hysteresis is affected by the amplitude and frequency of the induced voltage, accurate correction of the delay time is difficult from a practical point of view.

PTL1
Japanese Patent No. 4,191,172
PTL2
Japanese Patent Unexamined Publication No. 2009-240041

SUMMARY OF THE INVENTION

A phase-shift detection device of the present invention detects a phase shift in motor driving, using a pulse-shaped position detection signal and a measurement signal. The position detection signal is based on a sensor signal from a magnetic pole position sensor disposed in a motor. The measurement signal is based on the induced voltage from windings for driving the motor.

The phase-shift detection device includes the following elements:
a level difference calculator for calculating a level difference between the level of the measurement signal at a rising timing of the position detection signal and the level of the measurement signal at a falling timing thereof; and
a phase-shift calculator for calculating the amount of phase shifts based on the level difference.

This configuration eliminates the need for detecting the phase of a local minimum value in an induced voltage waveform including the local minimum value, for example. Thus, a phase shift in motor driving can be detected with a simple configuration.

A motor drive device of the present invention includes the phase-shift detection device and a drive phase corrector for correcting a phase shift in motor driving based on the amount of phase shifts calculated in the phase-shift calculator.

With this simple configuration, a motor drive device that functions to correct a phase shift in motor driving can be implemented.

A brushless motor of the present invention includes the following elements:
a rotor holding a permanent magnet and disposed rotatably around a rotating shaft in the center;
a stator including a stator iron core having a plurality of salient poles, and the stator iron core being wound with windings corresponding to respective phases; and
the motor drive device.

With this simple configuration, a brushless motor that functions to correct a phase shift in motor driving can be implemented.

A phase-shift detection method of the present invention detects a phase shift in motor driving, using a pulse-shaped position detection signal and a measurement signal. The position detection signal is based on a sensor signal from a magnetic pole position sensor disposed in a motor. The measurement signal is based on the induced voltage from windings for driving the motor.

The phase-shift detection method includes the following steps:
calculating a level difference between the level of the measurement signal at a rising timing of the position detection signal and the level of the measurement signal at a falling timing thereof; and
calculating the amount of phase shifts based on the level difference.

Also this method eliminates the need for detecting the phase of a local minimum value in an induced voltage waveform including the local minimum value, for example. Thus, a phase shift in motor driving can be detected in a simple manner.

BRIEF DESCRIPTION OF THE DRAWINGS

FIG. 4A is a timing chart showing a measurement signal, an acquisition timing signal, and sensor signals when each position sensor is disposed in a normal position in the phase-shift detection device in accordance with the second exemplary embodiment.

FIG. 4B is a timing chart showing a measurement signal, an acquisition timing signal, and a sensor signal when each position sensor is not disposed in a normal position in the phase-shift detection device in accordance with the second exemplary embodiment.

DETAILED DESCRIPTION OF THE PREFERRED EMBODIMENTS

Hereinafter, a description is provided for a phase-shift detection device, a motor drive device, a brushless motor, and a phase-shift detection method in accordance with the exemplary embodiments of the present invention with reference to the accompanying drawings.

First Exemplary Embodiment

Figure 1:
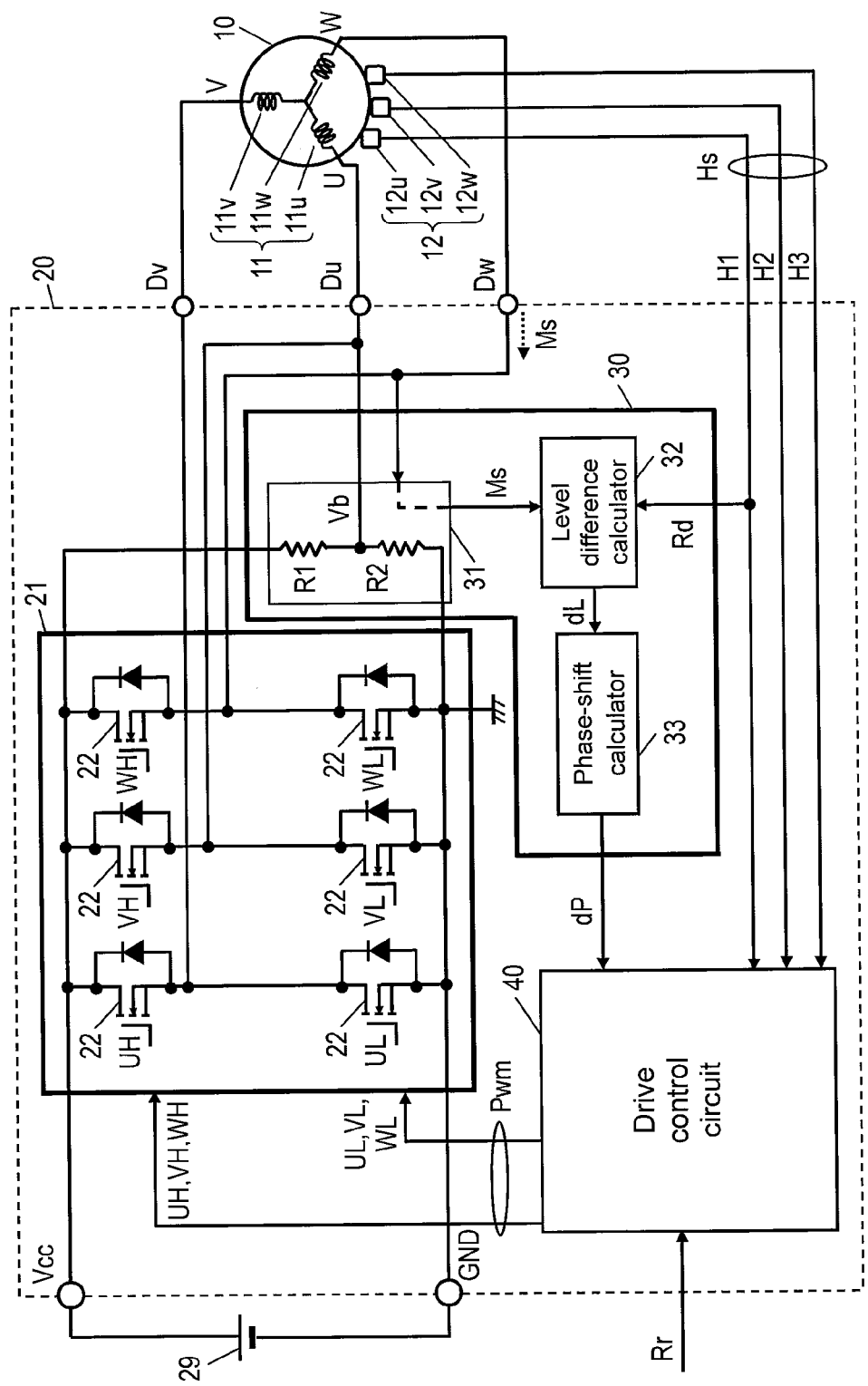
FIG. 1 is a block diagram of a brushless motor that includes a phase-shift detection device in accordance with a first exemplary embodiment of the present invention.

FIG. 1 is a block diagram of a brushless motor that includes phase-shift detection device 30 in accordance with the first exemplary embodiment of the present invention.

As shown in FIG. 1, the brushless motor is configured so as to include motor 10 having windings 11; position sensors 12, as magnetic pole position sensors for detecting the rotation position of the rotor of motor 10; and motor drive device 20 for driving motor 10. Electric power supply 29 is connected to motor drive device 20 in order to supply electric power thereto. In this exemplary embodiment, a description is provided for an example of a brushless motor with the following configuration. Motor 10 includes a rotor disposed rotatably around a rotating shaft in the center, and a stator having windings 11 in respective phases wound on the stator iron core. The brushless motor is driven in three phases 120 degrees out of phase with each other, i.e. the U phase, the V phase, and the W phase. That is, U-phase winding 11$u$, V-phase winding 11$v$, and W-phase winding 11$w$ are wound on the stator of motor 10. One end of each winding is connected at a neutral point so as to form Y connection. To the other end of each winding, an energization signal for driving the winding is supplied from motor drive device 20. In order to detect the position of each phase, this brushless motor has U-phase position sensor 12$u$, V-phase position sensor 12$v$, and W-phase position sensor 12$w$, as position sensors 12 made of Hall sensors, for example. Sensor signal Hs showing a detection position is supplied from each position sensor 12 to motor drive device 20.

Motor drive device 20 includes inverter 21, phase-shift detection device 30 and drive control circuit 40.

Drive control circuit 40 receives rotation command data Rr for instructing a rotation speed, a rotation position, or the like from an external pre-stage device, for example. Further, as sensor signals Hs, sensor signal H1 from position sensor 12$u$, sensor signal H2 from position sensor 12$v$, and sensor signal H3 from position sensor 12$w$ are supplied to drive control circuit 40. Phase-shift data dP is also supplied to the drive control circuit from phase-shift detection device 30. Drive control circuit 40 generates rotation position data that shows the rotation position of the rotor in response to sensor signals Hs. At this time, drive control circuit 40 generates the rotation position data by correcting the rotation position detected in response to sensor signals Hs, based on phase-shift data dP. The configuration and operation of correcting the rotation position in this manner are detailed below. Drive control circuit 40 further generates pulse-shaped drive pulse signal Pwm for driving inverter 21, based on the amount of deviation between rotation command data Rr and the rotation position data, or the amount of deviation between rotation command data Rr and the rotation speed data generated based on the rotation position data.

Inverter 21 drives windings 11 by energizing windings 11 in the respective phases, based on drive pulse signal Pwm. Inverter 21 has switching elements 22 connected to the side of Vcc, i.e. the positive electrode, of electric power supply 29, and switching elements 22 connected to the side of ground GND, i.e. the negative electrode thereof in the respective U phase, V phase, and W phase. The opposite power supply sides of respective switching elements 22 in positive electrode side and negative electrode side are connected each other. An energization signal for energizing and driving windings 11 is output from these connection parts via drive output ends. U-phase energization signal U is supplied to winding 11u from drive output end Du. V-phase energization signal V is supplied to winding 11v from drive output end Dv. W-phase energization signal W is supplied to winding 11w from drive output end Dw. When switching element 22 is set to ON or OFF in response to drive pulse signal Pwm in each phase, an energizing drive current is fed from electric power supply 29 via switching element 22 set to ON to corresponding winding 11.

The above configuration forms a feedback control loop for controlling the rotation speed and the rotation position of the rotor in accordance with rotation command data Rr.

Further, the brushless motor of this exemplary embodiment includes phase-shift detection device 30 in order to compensate for the effect on position detection caused by the misalignment of position sensors 12u, 12v, and 12w mounted on the circuit board, the misaligned installation position of the circuit board, or the like.

Phase-shift detection device 30 detects a phase shift in motor driving, using a pulse-shaped position detection signal and measurement signal Ms. The position detection signal is based on sensor signal Hs from position sensor 12 disposed in motor 10. The measurement signal is based on the induced voltage from windings 11 for driving motor 10. For this processing, phase-shift detection device 30 includes measurement signal generator 31, level difference calculator 32, and phase-shift calculator 33. A sensor signal in one of the phases among three sensor signals Hs is supplied to phase-shift detection device 30. The phase-shift detection device is connected to two of three drive output ends Du, Dv, and Dw. FIG. 1 shows an example of the following case: sensor signal H1 is supplied to level difference calculator 32 without change, as position detection signal Rd; bias voltage Vb generated in measurement signal generator 31 is connected to drive output end Du; and the signal at drive output end Dw is supplied to level difference calculator 32 via measurement signal generator 31. Phase-shift detection device 30 detects a phase shift in motor driving, using the induced voltage produced from windings 11. For this purpose, phase-shift detection device 30 uses the period during which motor 10 rotates in a non-driving state, such as a coasting state.

In order to detect a phase shift based on the induced voltage produced from windings 11 in a period during which motor 10 rotates in a non-driving state, measurement signal generator 31 generates measurement signal Ms. This measurement signal Ms is a signal based on the induced voltage. In order to generate measurement signal Ms, measurement signal generator 31 has a bias circuit for applying bias voltage Vb to the winding in one of the phases. With respect to FIG. 1, a series circuit of resistor R1 and resistor R2 is provided as a bias circuit between positive electrode Vcc and ground GND of electric power supply 29. The voltage divided by resistor R1 and resistor R2 is supplied, as bias voltage Vb, to winding 11u via drive output end Du.

Further, as measurement signal Ms, measurement signal generator 31 outputs the induced voltage produced from the windings other than the winding applied with bias voltage Vb. In this exemplary embodiment, measurement signal generator 31 acquires the voltage waveform at drive output end Dw applied with the induced voltage produced from winding 11w, and outputs this voltage waveform as measurement signal Ms. FIG. 1 shows an example where measurement signal generator 31 outputs the voltage waveform at drive output end Dw without change, as measurement signal Ms. The voltage waveform at drive output end Dw may be converted into measurement signal Ms via an amplification circuit, an attenuation circuit, or the like that converts the voltage waveform at drive output end Dw into the waveform signal having an amplitude suitable for the measurement, and the converted signal may be output.

By applying bias voltage Vb to the drive output end in one of the phases, induced voltage in a sine waveform shape can be obtained from the drive output ends in the other phases in motor 10 rotating in a non-driving state. In this exemplary embodiment, a phase shift is detected, using the induced voltage in a sine waveform shape thus obtained, i.e. measurement signal Ms. Particularly in this exemplary embodiment, measurement signal Ms in a sine waveform shape is used. This offers an advantage that this waveform is less likely to cause erroneous detection than the waveform including a local minimum value is.

Figure 2:
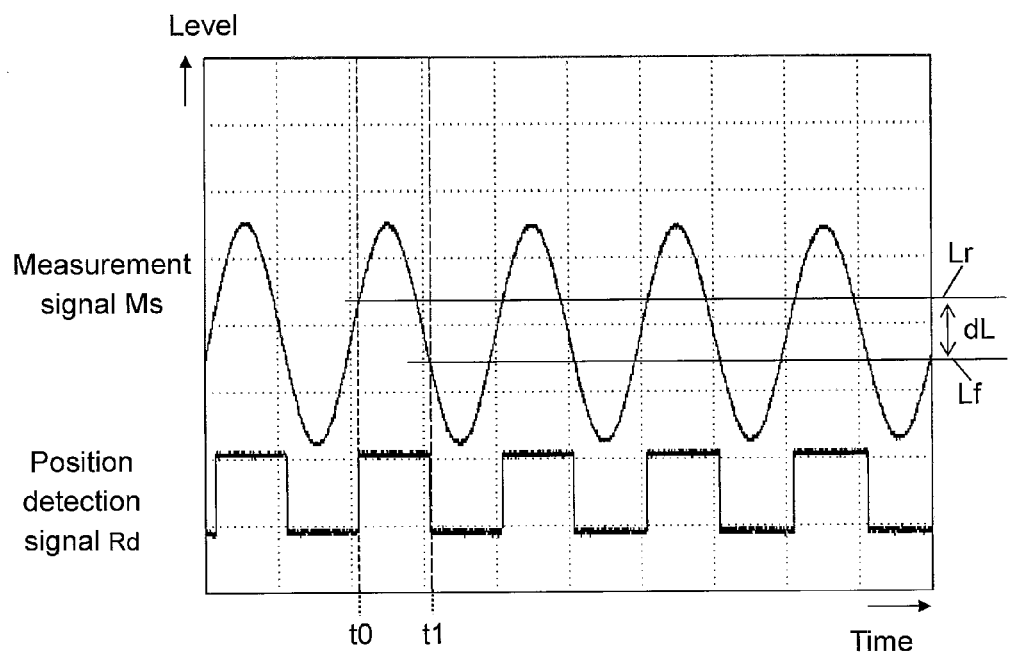
FIG. 2 is a chart showing waveforms of a measurement signal and a position detection signal supplied to the phase-shift detection device in accordance with the first exemplary embodiment.

FIG. 2 is a chart showing waveforms of measurement signal Ms and position detection signal Rd supplied to phase-shift detection device 30 in accordance with the first exemplary embodiment of the present invention. The top waveform in FIG. 2 shows measurement signal Ms, and the bottom waveform in FIG. 2 shows position detection signal Rd. When measurement signal generator 31 applies bias voltage Vb to the drive output end in one of the phases and the voltage at the drive output ends in the other phases is observed in a coasting state, measurement signal Ms in a sine waveform shape as shown in FIG. 2 can be obtained. Position detection signal Rd is a pulse-shaped signal as shown in FIG. 2. The two signals shown in FIG. 2 are supplied to level difference calculator 32.

Level difference calculator 32 calculates the level difference between the level of measurement signal Ms at the rising timing of position detection signal Rd and the level of measurement signal Ms at the falling timing thereof. FIG. 2 shows an example where the rising edge of position detection signal Rd at time t0 and the falling edge thereof at time t1 are used as the rising and falling timings of position detection signal Rd. First, using these timings, level difference calculator 32 detects level Lr of measurement signal Ms at time t0 and level Lf of measurement signal Ms at time t1. Next, level difference calculator 32 calculates level difference data dL=(Lr−Lf), which shows the level difference between level Lr and level Lf, and notifies level difference data dL to phase-shift calculator 33.

Based on notified level difference data dL, phase-shift calculator 33 calculates the amount of phase shifts. That is, as the phase of position detection signal Rd changes with respect to measurement signal Ms, level difference data dL changes accordingly. Based on the change in level difference data dL, phase-shift calculator 33 calculates the amount of phase shifts from level difference data dL. Phase-shift calculator 33 converts the amount of phase shifts into an electrical angle, for example, and supplies the converted data, as phase-shift data dP, to drive control circuit 40. Based on phase-shift data dP, drive control circuit 40 corrects the rotation position detected in response to sensor signals Hs, and generates a correction position signal.

At this time, the timings are set such that when position sensor 12u is disposed in a normal position, the timing of the peak value of measurement signal Ms corresponds to the central timing of the pulse of position detection signal Rd. With this setting, when position sensor 12u is disposed in a normal position, the levels of measurement signal Ms at the rising time and the falling time of position detection signal Rd are equal, and thus level difference data dL is zero. In contrast, when position sensor 12u is misaligned, the phase of position detection signal Rd with respect to measurement signal Ms shifts in response to the misalignment, and thus level Lr and level Lf are different as shown in FIG. 2. Substantially in proportion to the position of position sensor 12u, the magnitude of level difference data dL changes. That is, phase-shift calculator 33 can calculate the amount of phase shifts, using the phase in which level difference data dL is zero as a reference phase. The phase-shift calculator can detect the advance or delay of the phase, using the sign of level difference data dL, and calculate the amount of phase shifts from the reference phase based on the magnitude of the absolute value of level difference data dL. Further, in this manner, phase-shift detection device 30 calculates the amount of phase shifts based on the difference between the levels in a sine wave at the timings when the edge of position detection signal Rd changes. Thus, even when the duty ratio of position detection signal Rd, i.e. pulse width (t1−t0) of FIG. 2, changes, the change is cancelled out by the difference. This can enhance the accuracy of phase-shift detection.

In this exemplary embodiment, based on such a principle, a phase shift in motor driving caused by the misaligned mounting position of position sensor 12 is detected.

As described above, phase-shift detection device 30 detects a phase shift in motor driving, using the level difference between the level of measurement signal Ms at the rising timing of position detection signal Rd and the level of measurement signal Ms at the falling timing thereof. This eliminates the need for detecting the phase of a local minimum value in an induced voltage waveform including the local minimum value, for example. Thus, a phase shift in motor driving can be detected with a simple configuration. In this exemplary embodiment, a description is provided for an example of using measurement signal Ms in a sine waveform shape. However, the following configuration can be used. The level in the voltage-rising period and the level in the voltage-falling period in an induced voltage waveform including a local minimum value is acquired at the timings when the edge of position detection signal Rd changes, and the amount of phase shifts is calculated based on the level difference.

Particularly phase-shift detection device 30 of this exemplary embodiment detects a phase shift, using measurement signal Ms based on the induced voltage in a sine waveform shape. In this configuration, the detection is based on the level difference in the period during which the amount of change in the sine waveform shape is large, and the level difference changes substantially in proportion to the phase shift. Thus, in addition to the simple configuration, the phase shift in motor driving can be detected accurately.

The above description shows a configuration example where the misalignment of only U-phase position sensor 12u is detected. In this configuration, it is only necessary to detect the misalignment in only one of the phases. Thus, the phase-shift detection device can be implemented with a simple configuration. However, when the following elements are added, the misalignments in the V phase and the W phase can be detected so as to enhance accuracy although the amount of hardware is increased. That is, bias voltage Vb is also applied to drive output end Dv and drive output end Dw so as to generate measurement signals Ms in a sine waveform corresponding to the V phase and the W phase. By calculating the level difference in a manner similar to that in the U phase, the misalignment of V-phase position sensor 12v and the misalignment of W-phase position sensor 12w can be detected. The phase-shift calculator calculates a phase shift in each phase. The phase shift in each phase can be corrected in the drive control circuit.

In this exemplary embodiment, a description is provided for a three-phase driven brushless motor, as an example. This exemplary embodiment can be used for a two-phase driven brushless motor.

FIG. 2 shows an example where the level difference is calculated using a change in the edge of one pulse in position detection signal Rd. However, the level differences may be calculated using changes in the edge of a plurality of pulses and the average value of calculation results may be used as level difference data dL. This configuration can suppress the effect of noise, for example.

The above description shows a configuration example of detecting a misalignment using functional blocks. However, the misalignment can be detected with the similar advantages also by the following phase-shift detection method. The level difference between the level of measurement signal Ms at the rising timing of position detection signal Rd and the level of measurement signal Ms at the falling timing thereof is calculated. Then, the amount of phase shifts based on the level difference is calculated. Such a phase-shift detection method can be easily implemented using microcomputers, for example, which will be described later.

Second Exemplary Embodiment

Figure 3:
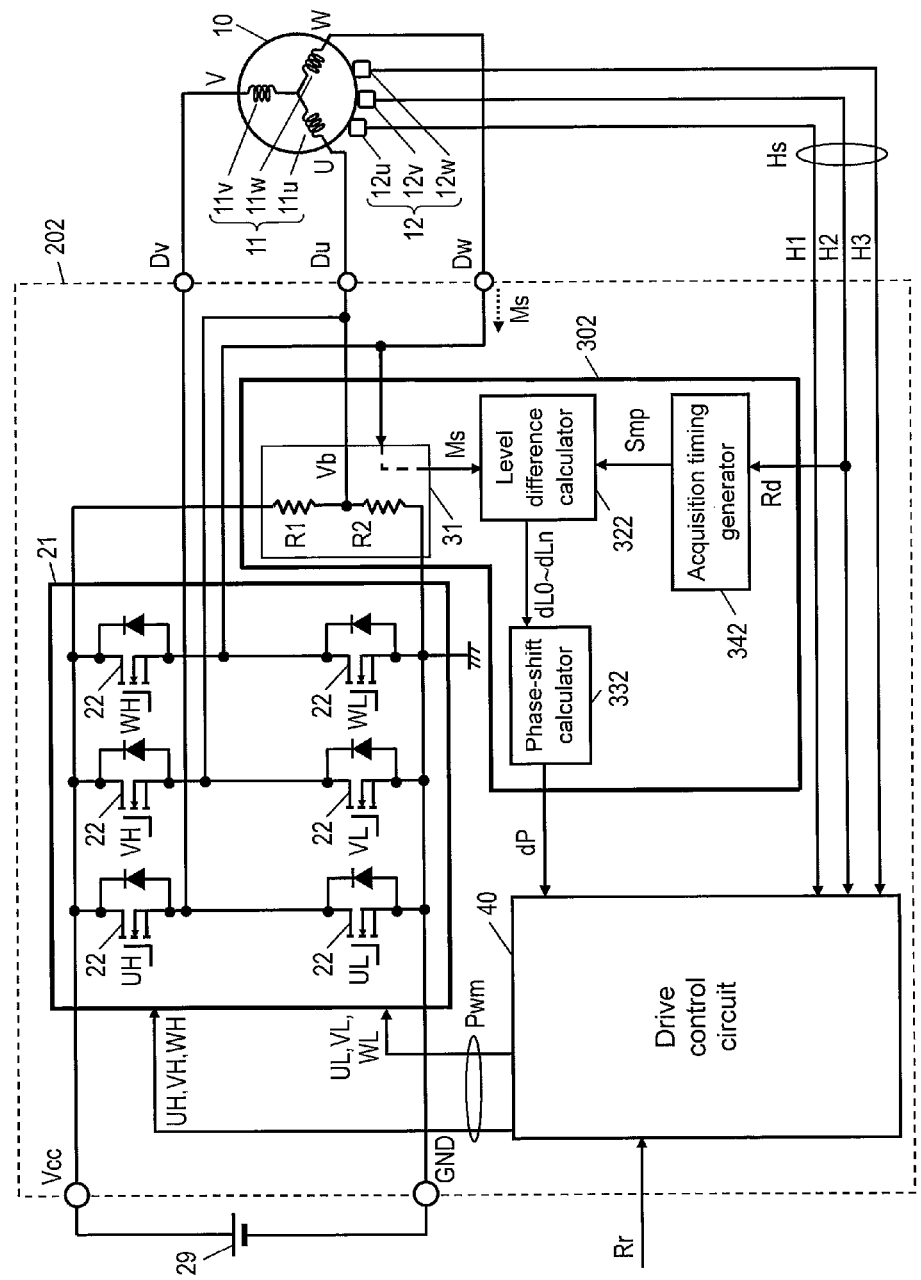
FIG. 3 is a block diagram of a brushless motor that includes a phase-shift detection device in accordance with a second exemplary embodiment of the present invention.

FIG. 3 is a block diagram of a brushless motor that includes phase-shift detection device 302 in accordance with the second exemplary embodiment of the present invention. In comparison with the configuration of the first exemplary embodiment of FIG. 1, in the brushless motor of FIG. 3, phase-shift detection device 302 in motor drive device 202 further includes acquisition timing generator 342, and level difference calculator 322 and phase-shift calculator 332 perform processing different from that in the first exemplary embodiment. The elements similar to those in FIG. 1 have the same reference marks and the descriptions of those elements are omitted.

Also in this exemplary embodiment, phase-shift detection device 302 detects a phase shift in motor driving, using sensor signals Hs from position sensors 12 disposed in motor 10 and measurement signal Ms based on the induced voltage from windings 11 for driving motor 10. For this processing, phase-shift detection device 302 has measurement signal generator 31, level difference calculator 322, phase-shift calculator 332, and acquisition timing generator 342. A sensor signal in one of the phases among three sensor signals Hs is supplied to phase-shift detection device 302. The phase-shift detection device is connected to two of three drive output ends Du, Dv, and Dw. FIG. 3 shows an example of the following case:

sensor signal 112 is supplied to acquisition timing generator 342; bias voltage Vb generated in measurement signal generator 31 is connected to drive output end Du; and the signal at drive output end Dw is supplied to level difference calculator 322 via measurement signal generator 31. As details are described below, in this exemplary embodiment, acquisition timing generator 342 generates timings before and after the rising edge and the falling edge of position detection signal Rd, using the timings when the edge of sensor signal H2 changes. That is, in this exemplary embodiment, in reference to the rising edge and the falling edge of position detection signal Rd based on sensor signal H1 in the first exemplary embodiment, the timings before and after the rising edge and the timings before and after the falling edge are generated. In this exemplary embodiment, the respective levels of measurement signal Ms are measured at these timings and the levels are acquired as level data. Also in this exemplary embodiment, phase-shift detection device 302 uses the period during which motor 10 rotates in a non-driving state, and detects a phase shift using the induced voltage in the period.

With reference to FIG. 3, sensor signal H2 is supplied to acquisition timing generator 342. As described above, using sensor signal H2, acquisition timing generator 342 generates timings before and after the rising edge and the falling edge of position detection signal Rd based on sensor signal H1. The timings generated by acquisition timing generator 342 are a plurality of timings in a constant cycle before and after the rising timing of position detection signal Rd and a plurality of timings in a constant cycle before and after the falling timing of position detection signal Rd. The generated timings are supplied to level difference calculator 322 as acquisition timing signals Smp.

Level difference calculator 322 measures the levels of measurement signal Ms at respective timings indicated by acquisition timing signals Smp, and acquires the levels as level data. Using the respective level data acquired, level difference calculator 322 calculates a plurality of level differences at the timings before and after the rising timing and the falling timing of position detection signal Rd. Level difference calculator 322 supplies the respective level differences calculated, i.e. level difference data dL0-dLn, to phase-shift calculator 332.

Using a plurality of supplied level difference data dL0-dLn, phase-shift calculator 332 determines the timing when the level difference is zero. That is, the phase-shift calculator determines a zero-crossing timing in signals obtained by sequentially calculating the level differences between two points in measurement signal Ms. Phase-shift calculator 332 calculates a phase shift from the timing when the level difference is zero, and outputs the calculated results as phase-shift data dP.

Figure 5:
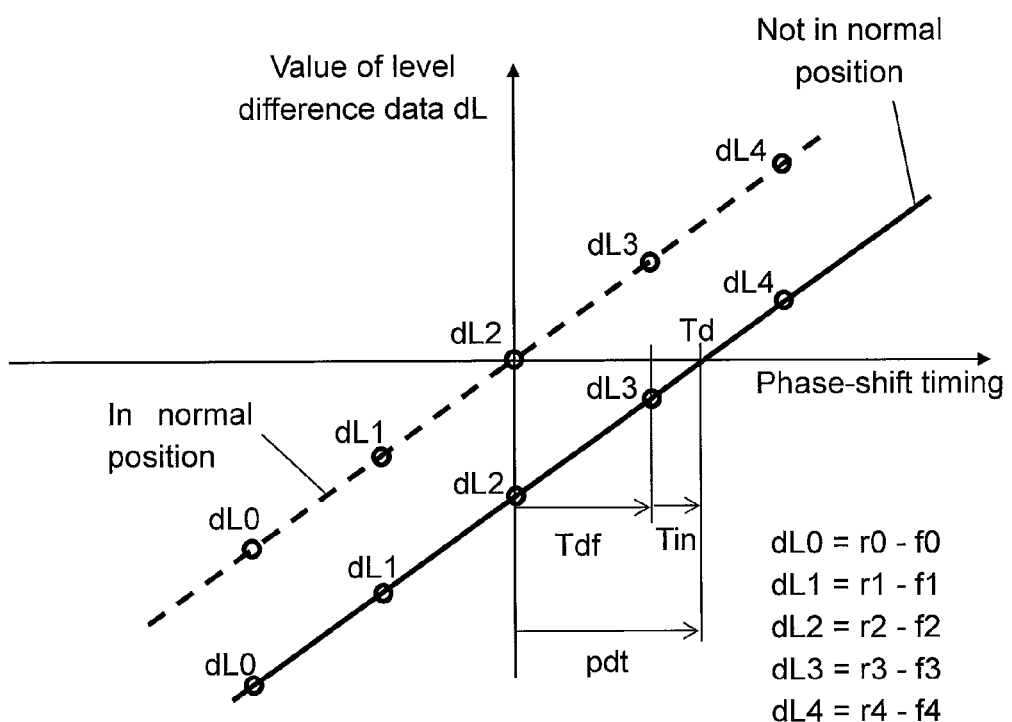
FIG. 5 is a chart showing a method for calculating phase-shift data to be calculated in the phase-shift calculator in the phase-shift detection device in accordance with the second exemplary embodiment.

FIG. 4A and FIG. 4B are timing charts each showing measurement signal Ms, acquisition timing signal Smp, and sensor signals Hs in accordance with the second exemplary embodiment of the present invention. FIG. 5 is a chart showing a method for calculating phase-shift data dP to be calculated in phase-shift calculator 332 in accordance with the second exemplary embodiment. Hereinafter, a description is provided for the details of phase-shift detection device 302 with reference to FIG. 4A, FIG. 4B, and FIG. 5.

FIG. 4A shows respective timings when each of position sensors 12u, 12v, and 12w is disposed in a normal position. FIG. 4B shows respective timings when position sensor 12v is not disposed in a normal position. These timing charts show an example where acquisition timing generator 342 generates five sampling timings before and after the rising edge and the falling edge of position detection signal Rd. The number of sampling times is not limited to five, and only needs to be greater than one.

Acquisition timing generator 342 generates acquisition timing signals Smp as shown in FIG. 4A and FIG. 4B. That is, first, acquisition timing generator 342 generates a timing delayed from the falling edge of supplied sensor signal H2 by time Tld. Here, when each position sensor 12 is disposed in a normal position, sensor signals Hs are 120 degrees in electrical angle out of phase with each other as shown in FIG. 4A. The timing delayed by time Tld can be generated by shorting the timing given by 120 degrees in electrical angle by a predetermined time period. Next, acquisition timing generator 342 generates five sampling timings in constant cycle Tck starting at the timing delayed from the falling edge of sensor signal H2 by time Tld. At this time, as shown in FIG. 4A, the timings are set such that when position sensor 12v is in a normal position, the third sampling timing corresponds to the rising timing of position detection signal Rd based on sensor signal H1. In other words, in reference to rising timing t0 of position detection signal Rd, five sampling timings before and after the reference are generated. Further, acquisition timing generator 342 generates a timing delayed from the rising edge of supplied sensor signal H2 by time Tld. Next, the acquisition timing generator generates five sampling timings in constant cycle Tck starting at this generated timing. Further, the timings are set such that when position sensor 12v is in a normal position, the third sampling timing corresponds to the falling timing of position detection signal Rd. That is, in reference to falling timing t1 of position detection signal Rd, acquisition timing generator 342 generates five sampling timings before and after the reference. Acquisition timing generator 342 supplies acquisition timing signals Smp showing such sampling timings to level difference calculator 322.

Level difference calculator 322 acquires level data of measurement signal Ms at respective sampling timings indicated by acquisition timing signals Smp. FIG. 4A and FIG. 4B show an example of acquiring the levels of measurement signal Ms before and after the rising edge of position detection signal Rd as level data r0-r4, and the levels of measurement signal Ms before and after the falling edge of position detection signal Rd as level data f0-f4. Here, suppose level data r0-r4 obtained before and after the rising edge of position detection signal Rd forms one group and level data f0-f4 obtained before and after the falling edge of position detection signal Rd forms the other group. The difference between these groups is calculated from the top level data in order. That is, level difference calculator 322 calculates the difference between top level data r0 and top level data f0, i.e. (r0−f0), as level difference data dL0=r0−f0. Similarly, level difference calculator 322 calculates level difference data dL1=r1−f1, dL2=r2−f2, dL3=r343, and dL4=r4−f4.

Phase-shift calculator 332 calculates a phase shift, using a plurality of level difference data dL0, dL1, dL2, dL3, and dL4 supplied from level difference calculator 322, and outputs the calculated results as phase-shift data dP.

FIG. 5 shows the relation between respective values of level difference data and phase-shift timings. In FIG. 5, the broken line shows the relation when position sensor 12v is disposed in a normal position, i.e. the case of FIG. 4A. The solid line shows the relation when position sensor 12v is not disposed in a normal position, i.e. the case of FIG. 4B.

First, a description is provided for the case where position sensor 12v is disposed in a normal position. As described above, the timings are set such that the third sampling timings correspond to the rising and falling timings of position detection signal Rd, and these timings show a zero-crossing timing in signals obtained by sequentially calculating the difference between two points in measurement signal Ms. Thus, the value of level difference data dL2 corresponding to the third sampling timings is zero. In the present invention, the measurement signal is processed based on the level difference between two points. Thus, even in the case of measurement signal Ms to which offset voltage, such as DC voltage, is added, the value of level difference data dL2 is zero.

In contrast, when position sensor 12v is misaligned, the relation of the phase of sensor signal H2 with respect to measurement signal Ms shifts as shown in FIG. 4B. FIG. 4B shows the case where sensor signal H2 shifts in the forward direction by time Td in comparison with the case of sensor signal H2 in the normal position. Thus, acquisition timing signals Smp also shift in the forward direction. As a result, the respective values of level difference data are smaller than those in the case of the normal position, as shown in FIG. 5. That is, in response to the phase shift, the straight line connecting the respective values of the level difference data shifts in parallel in reference to the broken straight line shown in FIG. 5. The point where the solid straight line of FIG. 5 crosses the horizontal line, i.e. the zero-crossing timing where the level difference is zero, shows shifted time Td. Thus, by determining the timing of sensor signal H2 when the level difference is zero, the phase shift from the timing can be calculated.

Based on such a principle, phase-shift calculator 332 calculates shifted time Td using the plurality of level difference data. That is, first, using level difference data dL2 and dL3, the phase-shift calculator calculates timing shift Tdf shown in FIG. 5. Further, using level difference data dL3 and dL4, the phase-shift calculator calculates timing shift Tin by linear interpolation, for example. Phase-shift calculator 332 adds timing shift Tdf and timing shift Tin so as to calculate shifted time Td by inverse operation. Phase-shift calculator 332 sets this timing calculated by inverse operation as phase shift pdt, and generates and outputs phase-shift data dP corresponding to this phase shift pdt.

As described above, in phase-shift detection device 302 of this exemplary embodiment, level difference calculator 322 sets the rising timing and the falling timing of position detection signal Rd as a reference and calculates a plurality of level difference data dL at timings before and after the reference. Phase-shift calculator 332 determines the timing when the level difference is zero using the plurality of level difference data dL, and calculates phase shift pdt from the timing. In this manner, phase-shift detection device 302 of this exemplary embodiment uses a method for calculating the timing when the level difference is zero by inverse operation, using a plurality of level difference data dL. Thus, the phase-shift detection device is not affected by the amplitude of induced voltage and can accurately detect a drive phase shift.

The above description shows a configuration example of detecting a misalignment using functional blocks. However, the misalignment can be detected with the similar advantages also by the following phase-shift detection method. The rising timing and the falling timing of position detection signal Rd are set as a reference, a plurality of level differences at timings before and after the reference is calculated, the timing when the level difference is zero is determined using the plurality of level differences, and a phase shift from the timing is calculated. Such a phase-shift detection method can be easily implemented using microcomputers, for example, which will be described later.

Third Exemplary Embodiment

Figure 6:
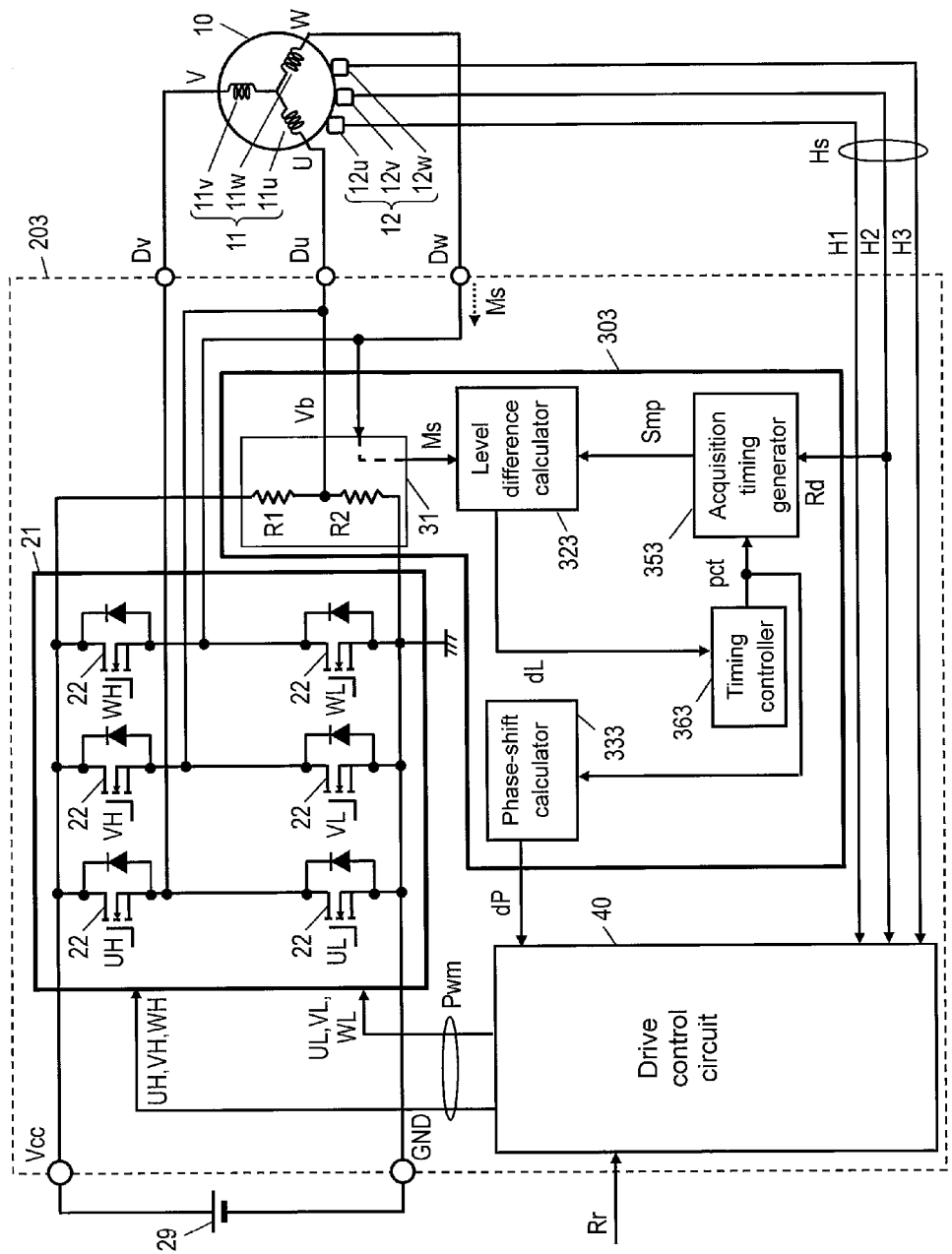
FIG. 6 is a block diagram of a brushless motor that includes a phase-shift detection device in accordance with a third exemplary embodiment of the present invention.

FIG. 6 is a block diagram of a brushless motor that includes phase-shift detection device 303 in accordance with the third exemplary embodiment of the present invention. In comparison with the configuration of the second exemplary embodiment of FIG. 3, in the brushless motor of FIG. 6, phase-shift detection device 303 in motor drive device 203 further includes timing controller 363, and level difference calculator 323, phase-shift calculator 333, and acquisition timing generator 353 perform processing different from that in the second exemplary embodiment. The elements similar to those in FIG. 1 and FIG. 3 have the same reference marks and the descriptions of those elements are omitted.

Also in this exemplary embodiment, phase-shift detection device 303 detects a phase shift in motor driving, using sensor signals Hs from position sensors 12 disposed in motor 10 and measurement signal Ms based on the induced voltage from windings 11 for driving motor 10. For this processing, phase-shift detection device 303 has measurement signal generator 31, level difference calculator 323, phase-shift calculator 333, acquisition timing generator 353, and timing controller 363. A sensor signal in one of the phases among three sensor signals Hs is supplied to phase-shift detection device 303. The phase-shift detection device is connected to two of three drive output ends Du, Dv, and Dw. FIG. 6 shows an example of the following case: sensor signal H2 is supplied to acquisition timing generator 353; bias voltage Vb generated in measurement signal generator 31 is connected to drive output end Du; and the signal from drive output end Dw is supplied to level difference calculator 323 via measurement signal generator 31. As details will be described below, in this exemplary embodiment, acquisition timing generator 353 generates sampling timings in the vicinity of the rising edge and the falling edge of position detection signal Rd, using the timings when the edge of sensor signal H2 changes. The sampling timings generated by acquisition timing generator 353 are controlled by timing controller 363 in reference to the rising edge and the falling edge of position detection signal Rd. In this exemplary embodiment, while such sampling timings are adjusted, and the levels of two points in measurement signal Ms are measured and acquired as level data. Also in this exemplary embodiment, phase-shift detection device 303 uses the period during which motor 10 rotates in a non-driving state, for example, and detects a phase shift using the induced voltage in the period.

With reference to FIG. 6, sensor signal H2 is supplied to acquisition timing generator 353. Using sensor signal H2, acquisition timing generator 353 generates two sampling timings in the vicinity of the rising edge and the falling edge of position detection signal Rd based on sensor signal H1. The sampling timings generated by acquisition timing generator 353 can be adjusted by control of timing controller 363 in the advance direction and the delay direction in reference to the rising timing of position detection signal Rd and the falling timing of position detection signal Rd. The generated timings are supplied to level difference calculator 323 as acquisition timing signals Smp.

Level difference calculator 323 measures the levels of measurement signal Ms at two sampling timings indicated by acquisition timing signals Smp, and acquires the levels as level data. Level difference calculator 323 calculates a level difference by performing a difference operation on the acquired two pieces of level data. Level difference calculator 323 supplies level difference data dL, i.e. the calculated level difference, to timing controller 363.

Timing controller 363 calculates an error value between supplied level difference data dL and a target value of zero. The timing controller performs integration processing, integration gain processing, and proportional gain processing on the error value, and supplies the processed data to acquisition timing generator 353, as control data pct. Based on control data pct, acquisition timing generator 353 adjusts the sampling timings in the direction where level difference data dL is zero.

Figure 7:
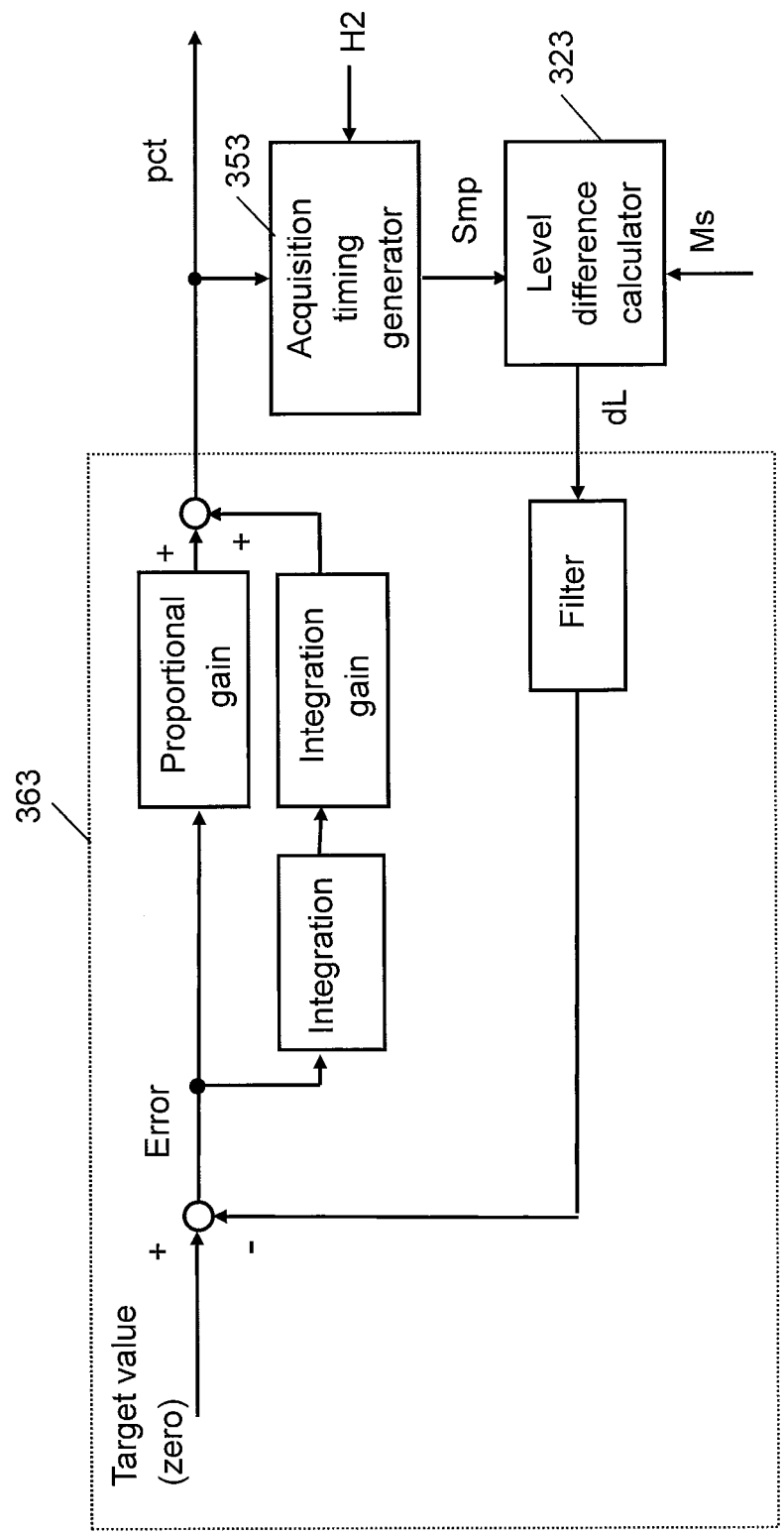
FIG. 7 is a block diagram of a feedback loop formed in the phase-shift detection device in accordance with the third exemplary embodiment.

That is, in this exemplary embodiment, level difference calculator 323, timing controller 363, and acquisition timing generator 353 form a feedback loop. FIG. 7 is a block diagram of a feedback loop formed in this manner. In the thus formed feedback loop, the loop is locked at the sampling timing when level difference data dL is zero. That is, in this exemplary embodiment, by forming a feedback loop as shown in FIG. 7, the advance or delay of the phase is detected using the sign of level difference data dL, and the sampling timings of level difference detection are adjusted automatically in the direction where level difference data dL is zero. Here, the timing when the level difference is zero corresponds to control data pct for adjusting the sampling timings, and to the amount of phase shifts in sensor signal H2. That is, the amount of phase shifts in sensor signal H2 can be calculated using control data pct.

Based on such a principle, phase-shift calculator 333 calculates the amount of phase shifts from the timing indicated by supplied control data pct, and outputs the calculation results as phase-shift data dP.

As described above, in addition to level difference calculator 323 and phase-shift calculator 333, phase-shift detection device 303 of this exemplary embodiment has acquisition timing generator 353 for generating the rising timing and the falling timing of the position detection signal, and timing controller 363 for controlling the timings generated by acquisition timing generator 353. Level difference calculator 323 calculates the level difference in a measurement signal acquired at the timings generated by acquisition timing generator 353. Timing controller 363 makes control such that the advance or the delay of the phase is detected using the sign of the level difference, and the timings generated by acquisition timing generator 353 are adjusted in the direction where the level difference is zero. Further, phase-shift calculator 333 calculates a phase shift from the adjusted timing. Phase-shift detection device 303 of this exemplary embodiment forms a feedback loop for adjusting the timings of level difference detection in the direction where the level difference is zero, and determines the timing when the level difference is zero. In this manner, similarly to that of the second exemplary embodiment, phase-shift detection device 303 of this exemplary embodiment uses a method for calculating the timing when the level difference is zero by inverse operation, using level difference data dL. Thus, the phase-shift detection device is not affected by the amplitude of induced voltage and can accurately detect a drive phase shift.

The above description shows a configuration example of detecting a misalignment using functional blocks. However, the misalignment can be detected with the similar advantages also by the following phase-shift detection method. The advance or the delay of the phase is detected using the sign of the level difference and the timings of level difference detection are adjusted in the direction where the level difference is zero. Thereby, the timing when the level difference is zero is determined and a phase shift from the timing is detected. Such a phase-shift detection method can be easily implemented using microcomputers, for example, which will be described later.

Fourth Exemplary Embodiment

Figure 8:
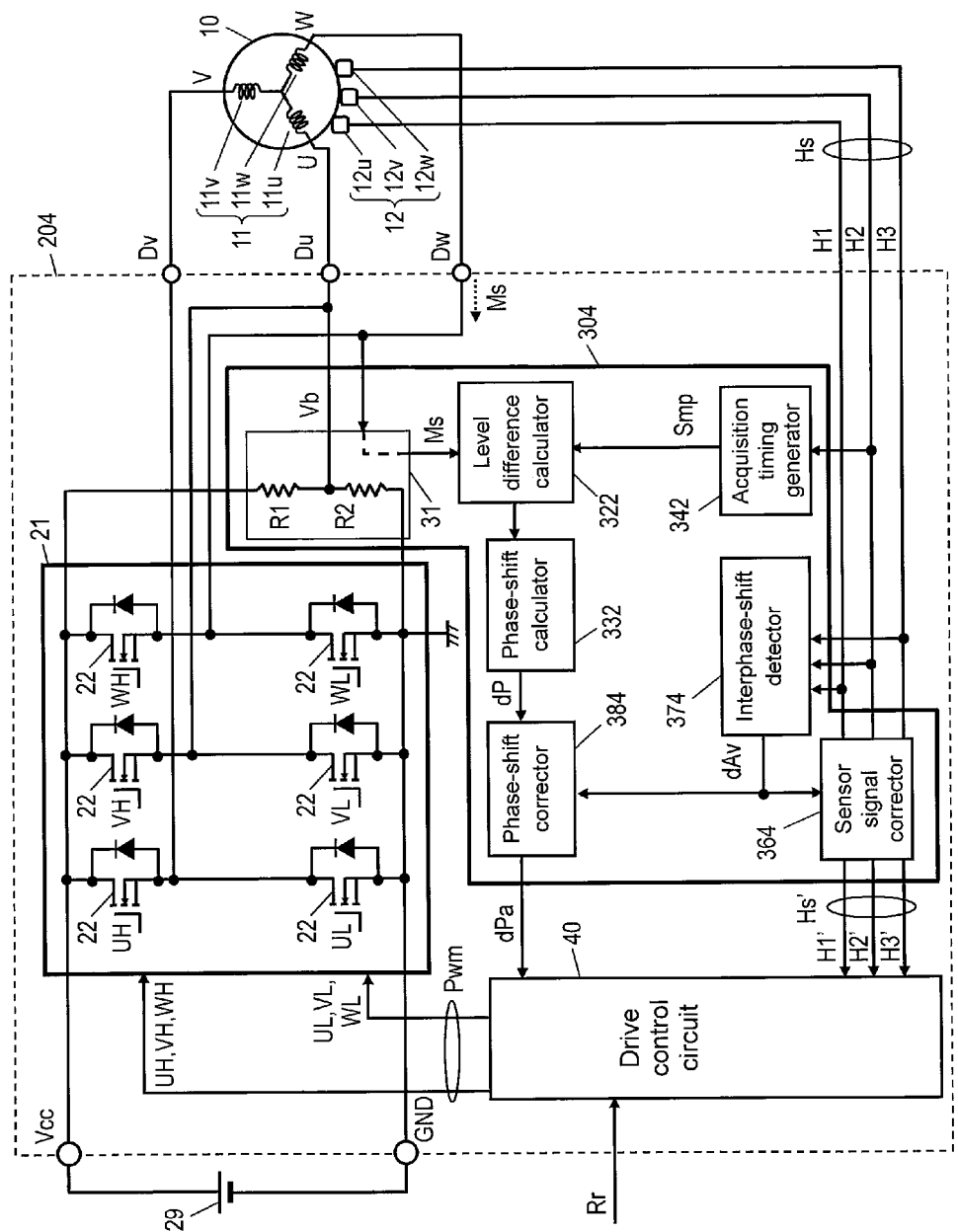
FIG. 8 is a block diagram of a brushless motor that includes a phase-shift detection device in accordance with a fourth exemplary embodiment of the present invention.

FIG. 8 is a block diagram of a brushless motor that includes phase-shift detection device 304 in accordance with the fourth exemplary embodiment of the present invention.

In comparison with the configuration of the second exemplary embodiment of FIG. 3, in the brushless motor of FIG. 8, phase-shift detection device 304 in motor drive device 204 further includes sensor signal corrector 364, interphase-shift detector 374, and phase-shift corrector 384. The elements similar to those in FIG. 3 have the same reference marks and the descriptions of those elements are omitted.

In phase-shift detection device 304, first, phase-shift data dP is output by a method similar to that of the second exemplary embodiment that uses measurement signal generator 31, level difference calculator 322, acquisition timing generator 342, and phase-shift calculator 332.

Further, in phase-shift detection device 304, interphase-shift detector 374 detects each of the amounts of interphase shifts, which is an interphase shift between sensor signals Hs, using sensor signals Hs in the three phases. That is, the interphase-shift detector detects the amount of interphase shifts from a reference electrical angle of 120 degrees between sensor signal H2 and sensor signal H1, and the amount of interphase shifts from a reference electrical angle of 120 degrees between sensor signal H2 and sensor signal H3, in reference to sensor signal H2, for example. Here, since the amount is detected in reference to sensor signal H2, the amount of interphase shifts of sensor signal H2 is zero. Interphase-shift detector 374 further calculates the average amount of interphase shifts, which is an average value of the respective amounts of interphase shifts, and supplies the calculated average amount of interphase shifts to phase-shift corrector 384 and sensor signal corrector 364.

Phase-shift corrector 384 corrects phase-shift data dP calculated by phase-shift calculator 332, using the average amount of interphase shifts, and supplies the corrected results to drive control circuit 40, as correction phase shift data dPa. Further, sensor signal corrector 364 corrects respective sensor signals Hs using the average amount of interphase shifts, and supplies the corrected results to drive control circuit 40, as correction sensor signals Hs'.

Figure 9:
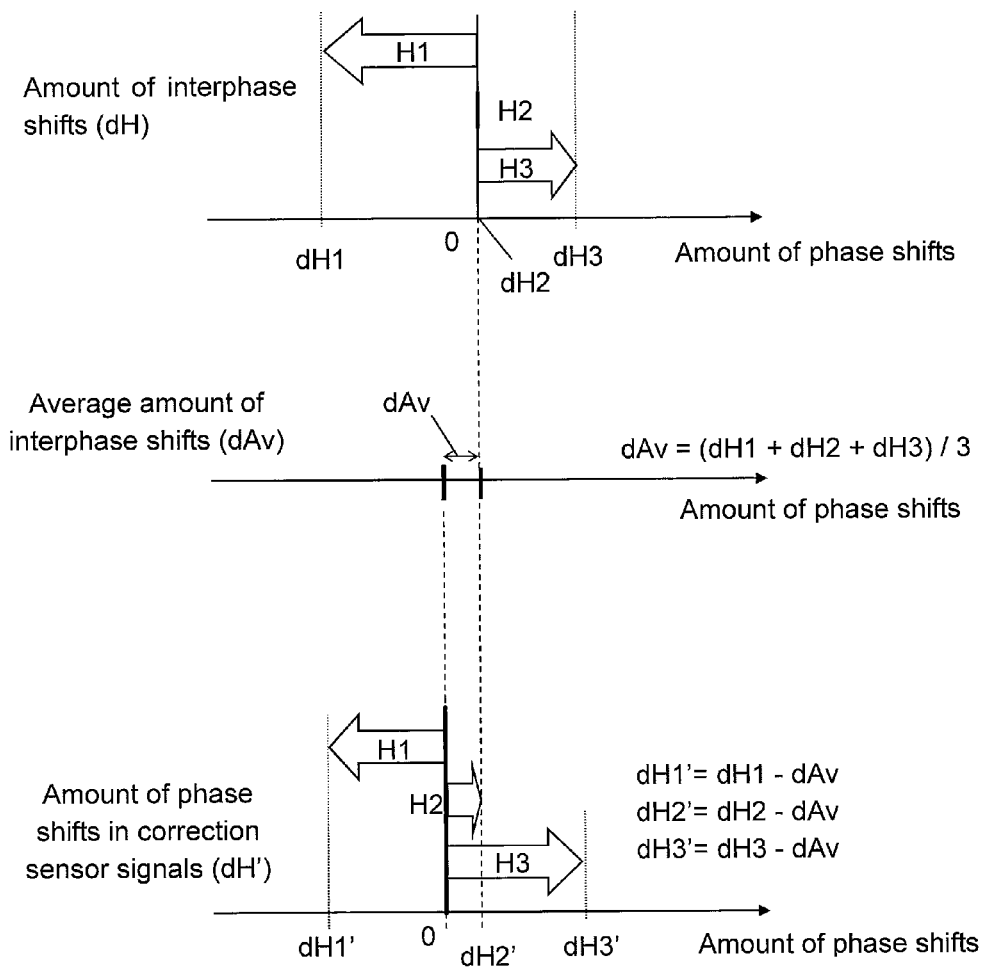
FIG. 9 is a chart for explaining processing in an interphase-shift detector and a phase-shift corrector in the phase-shift detection device in accordance with the fourth exemplary embodiment.

FIG. 9 is a chart for explaining the processing in interphase-shift detector 374, phase-shift corrector 384, and sensor signal corrector 364 in accordance with the fourth exemplary embodiment of the present invention. Hereinafter, with reference to FIG. 9, a detailed description is provided for the operations to be performed by interphase-shift detector 374, phase-shift corrector 384, and sensor signal corrector 364.

The top chart in FIG. 9 shows the respective amounts of interphase shifts. The amount of interphase shift between sensor signals H2 and H1 is shown as interphase shift data dH1, the amount of interphase shift between sensor signals H2 and H3 as interphase shift data dH3, and the amount of interphase shift in sensor signal H2 as interphase shift data dH2. The middle chart in FIG. 9 shows average interphase shift data dAv, which is the average amount of interphase shifts. The bottom chart in FIG. 9 shows amounts of phase shifts dH1', dH2', and dH3' in correction sensor signals for correcting respective sensor signals H1, H2, and H3, using average interphase shift data dAv.

Using respective sensor signals Hs, interphase-shift detector 374 detects interphase shift data dill in sensor signal H1, interphase shift data dH2 in sensor signal H2, and interphase shift data dH3 in sensor signal H3 as shown by the top chart in FIG. 9, as interphase shifts in reference to sensor signal H2. Next, interphase-shift detector 374 calculates the average value of interphase shift data dill, dH2, and dH3. That is, as shown by the middle chart in FIG. 9, the interphase-shift detector calculates average interphase shift data dAv, by performing the operation of average interphase shift data dAv= (dH1+dH2+dH3)/3.

Sensor signal corrector 364 calculates amounts of phase shifts dHs' in the correction sensor signals for correcting the respective sensor signals Hs, and supplies correction sensor signals Hs' corrected based on amounts of phase shifts dHs' to drive control circuit 40. That is, as shown by the bottom chart in FIG. 9, the sensor signal corrector outputs correction sensor signal H1' corrected based on amount of phase shifts dH1'=dH1−dAv to sensor signal H1. The sensor signal corrector outputs correction sensor signal H2' corrected based on amount of phase shifts dH2'=dH2−dAv to sensor signal H2. The sensor signal corrector outputs correction sensor signal H3' corrected based on amount of phase shifts dH3'=dH3−dAv to sensor signal H3.

Further, in this exemplary embodiment, phase-shift corrector 384 corrects phase-shift data dP, using average interphase shift data dAv, and supplies the corrected results to drive control circuit 40, as correction phase-shift data dPa. That is, phase-shift corrector 384 corrects phase-shift data dP from phase-shift calculator 332 such that correction phase-shift data dPa=dP−dAv.

As described above, in phase-shift detection device 304 of this exemplary embodiment, interphase-shift detector 374 detects the amounts of interphase shifts, i.e. interphase shifts between respective sensor signals Hs, and calculates average interphase shift data dAv, i.e. the average value of the respective amounts of interphase shifts detected. Phase-shift corrector 384 corrects phase-shift data dP calculated by phase-shift calculator 332 using average interphase shift data dAv, and outputs the corrected results. Further, respective sensor signals Hs are corrected by sensor signal corrector 364, using average interphase shift data dAv. Drive control circuit 40 generates driving waveforms for driving windings 11, using correction phase-shift data dPa and correction sensor signals Hs' corrected based on the interphase shifts.

With this configuration, phase-shift data dP is replaced with a relative error from the average value of phase shifts in sensor signals Hs. The driving waveforms to be described below are output at timings of the signals where the phases of sensor signals Hs are corrected based on such correction phase-shift data dPa. Thereby, distortion in the driving waveforms can be suppressed.

The above description shows a configuration example of detecting a misalignment using functional blocks. However, the phase shift can be detected with the similar advantages also by the following phase-shift detection method. The amounts of interphase shifts, i.e. interphase shifts between respective sensor signals Hs, are detected, the amount of phase shifts in motor driving is corrected using the average value of the respective amounts of interphase shifts detected, and the correction results are output. Such a phase-shift detection method can be easily implemented using microcomputers, for example, which will be described later.

In this exemplary embodiment, a description is provided for a configuration example of correcting phase-shift data dP calculated by the method similar to that of the second exemplary embodiment. This exemplary embodiment can also be used for phase-shift data dP calculated by the method similar to that in the first exemplary embodiment or the third exemplary embodiment.

Fifth Exemplary Embodiment

Figure 10:
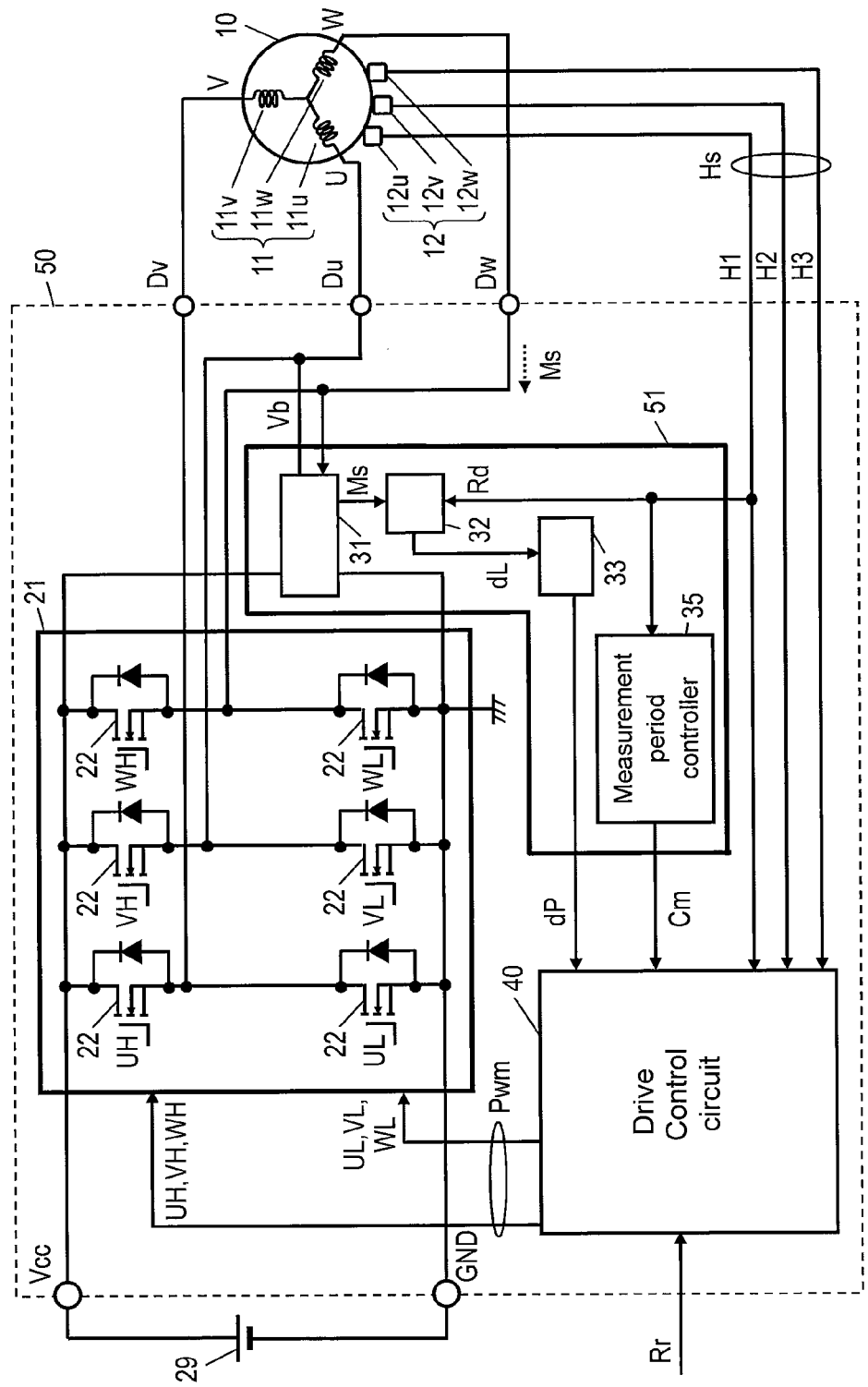
FIG. 10 is a block diagram of a brushless motor that includes a phase-shift detection device in accordance with a fifth exemplary embodiment of the present invention.

FIG. 10 is a block diagram of a brushless motor that includes phase-shift detection device 51 in accordance with the fifth exemplary embodiment of the present invention. In comparison with the configuration of the first exemplary embodiment of FIG. 1, in the brushless motor of FIG. 10, phase-shift detection device 51 in motor drive device 50 further includes measurement period controller 35. The elements similar to those in FIG. 1 have the same reference marks and the descriptions of those elements are omitted.

Measurement period controller 35 controls drive control circuit 40 so as to set a non-driving period in the driving operation period of motor 10. Phase-shift detection device 51 acquires the induced voltage in the non-driving period and generates measurement signal Ms. Particularly in this exemplary embodiment, non-driving periods each having a predetermined period width are set from time points before the rising timing and the falling timing to time points after the rising timing and the falling timing of position detection signal Rd. Measurement period controller 35 generates measurement periods during which the motor is not driven in short periods, by controlling drive control circuit 40 such that the driving of motor 10 is stopped.

Figure 11:
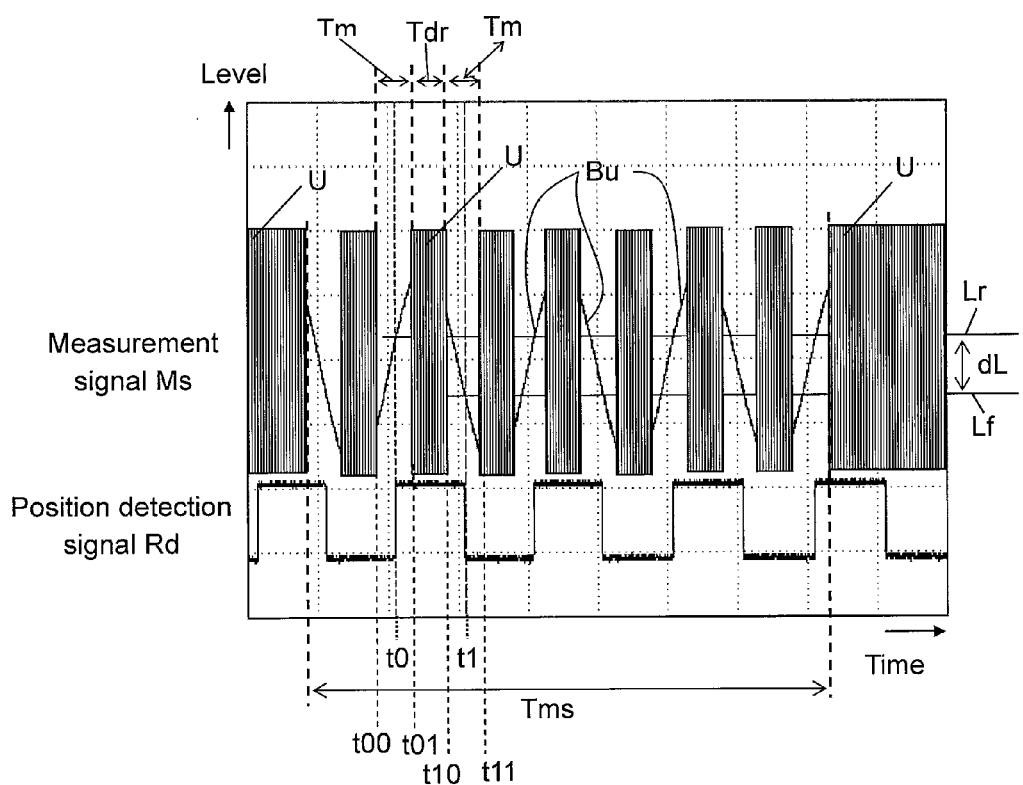
FIG. 11 is a chart showing waveforms of a measurement signal and a position detection signal in the phase-shift detection device in accordance with the fifth exemplary embodiment.

FIG. 11 is a chart showing waveforms of measurement signal Ms and position detection signal Rd in phase-shift detection device 51 in accordance with the fifth exemplary embodiment of the present invention. The top waveform in FIG. 11 shows measurement signal Ms, and the bottom waveform in FIG. 11 shows position detection signal Rd. In this exemplary embodiment, the driving of the motor is stopped partly in a driving operation period of motor 10 such that measurement periods are set. Thus, measurement signal Ms, i.e. the voltage waveform at drive output end Dw, is a waveform that includes an energization signal and induced voltage. That is, as shown in FIG. 11, measurement signal Ms includes energization signal U from inverter 21 and induced voltage Bu from windings 11 in the non-driving periods.

FIG. 11 shows an example of setting a phase-shift detection period having period width Tms, as a period during which phase shifts are detected. In the phase-shift detection period, the partial drive for repeating driving and non-driving of motor 10 is performed by the control of measurement period controller 35. Such non-driving measurement periods set include a measurement period having predetermined period width Tm from time t00 before rising time t0 of position detection signal Rd to time t01 after the rising time, and a measurement period having predetermined period width Tm from time t10 before falling time t1 of position detection signal Rd to time t11 after the falling time. In the phase-shift detection period, such a measurement period is set for the respective rising edges and falling edges of position detection signal Rd. Since the motor is not energized in these measurement periods, windings 11 produce induced voltage Bu, which is a part of a sine waveform, as shown in FIG. 11. In contrast, in the period having period width Tdr other than the measurement periods, measurement signal Ms has a voltage waveform generated by energization signal U.

Measurement period controller 35 generates measurement period signal Cm that shows the measurement period based on position detection signal Rd, and supplies the signal to drive control circuit 40. In response to measurement period signal Cm, drive control circuit 40 stops outputting drive pulse signal Pwm in the periods showing the measurement periods. Thereby, in the measurement periods, energization from inverter 21 to motor 10 is stopped.

Level difference calculator 32 detects level Lr of measurement signal Ms at the rising timing of position detection signal Rd and level Lf of measurement signal Ms at the falling timing thereof in such a measurement period, and generates level difference data dL.

As described above, in phase-shift detection device 51 of this exemplary embodiment, measurement periods each having predetermined period width Tm are set from time points before the rising timings and the falling timings of position detection signal Rd to time points after the rising timings and the falling timings, and the driving of motor 10 is stopped in the measurement periods. With this configuration, a misalignment can be detected while motor 10 is rotary-driven, and it is not necessary to set a special period during which a phase shift is detected. For instance, when a stand-alone motor is not partially driven unlike this exemplary embodiment, the rotation speed of the motor rapidly drops after the driving of the motor is stopped and a correct value cannot be detected. Therefore, during the measurement, some form of inertia needs to be connected to the motor. In contrast, when the motor is partially driven like this exemplary embodiment, a drop in the motor rotation speed after the driving of the motor is stopped is small even in the state where no inertia is connected thereto, i.e. a stand-alone motor. Therefore, the partial driving in this exemplary embodiment allows accurate detection of the value.

In this exemplary embodiment, a misalignment can be detected while motor 10 is rotary-driven. Thus, the following configuration may be used. The drive phase in which motor 10 is driven is corrected using phase-shift data dP detected by phase-shift detection device 51, and such an operation of detecting a phase shift is repeated. This configuration can suppress an error in the value of phase shift detection.

This exemplary embodiment shows a configuration example where measurement period controller 35 is added to the configuration of the first exemplary embodiment shown in FIG. 1. However, measurement period controller 35 can be added to the configuration of the second exemplary embodiment of FIG. 3, the configuration of the third exemplary embodiment of FIG. 6, or the configuration of the fourth exemplary embodiment of FIG. 8. Such configurations can offer the similar advantages.

The above description shows a configuration example of detecting a misalignment using functional blocks. However, the misalignment can be detected with the similar advantages also by the following phase-shift detection method. Measurement periods each having a predetermined period width are set from time points before the rising timings and the falling timings of the position detection signal to time points after the rising timings and the falling timings, and the driving of the motor is stopped in the measurement periods. Such a phase-shift detection method can be easily implemented using microcomputers, for example, which will be described later.

Sixth Exemplary Embodiment

Figure 12:
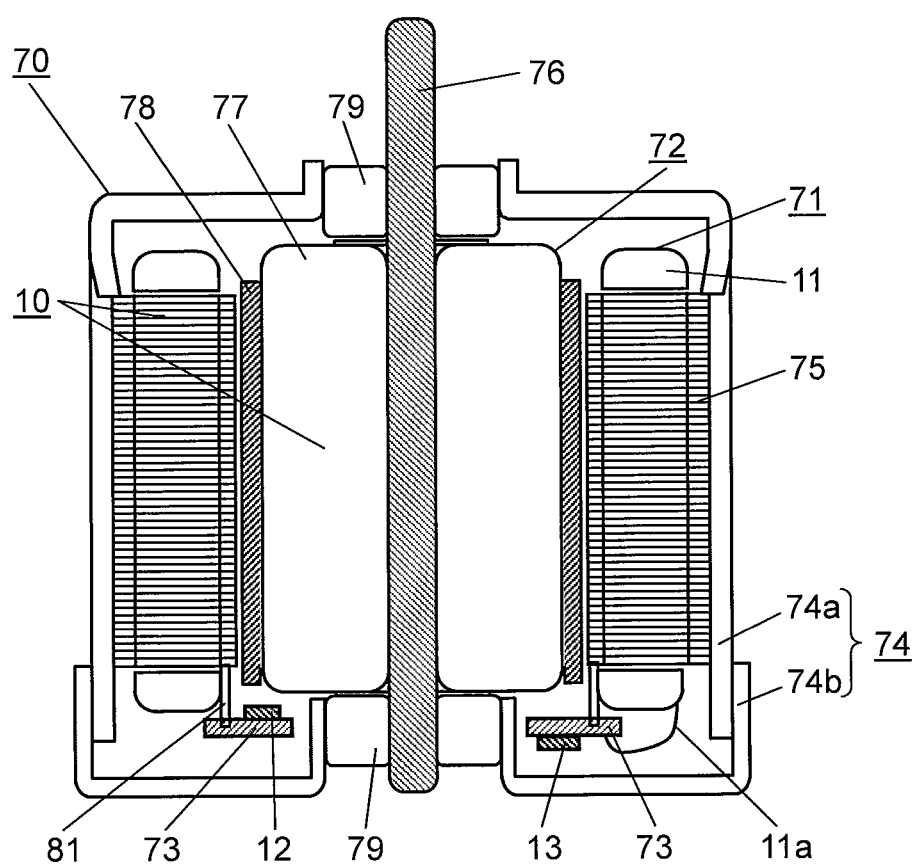
FIG. 12 is diagram showing a sectional structure of a brushless motor that includes a motor drive device in accordance with a sixth exemplary embodiment of the present invention.
Figure 13:
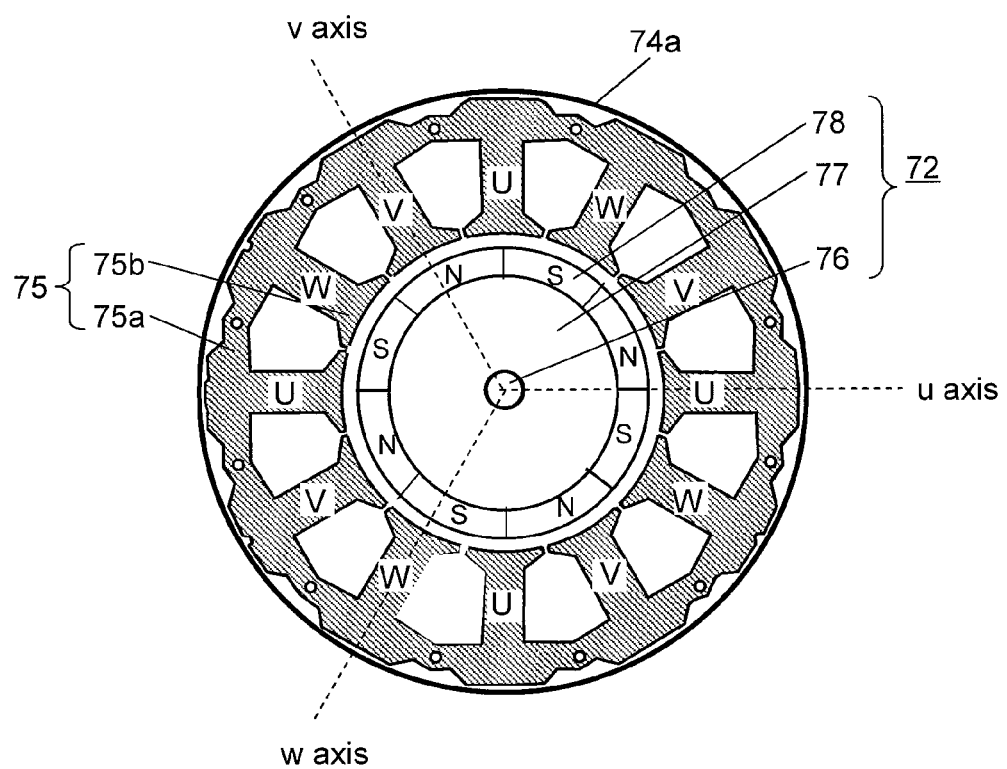
FIG. 13 is a diagram showing the inside of the brushless motor viewed from the top.
Figure 14:
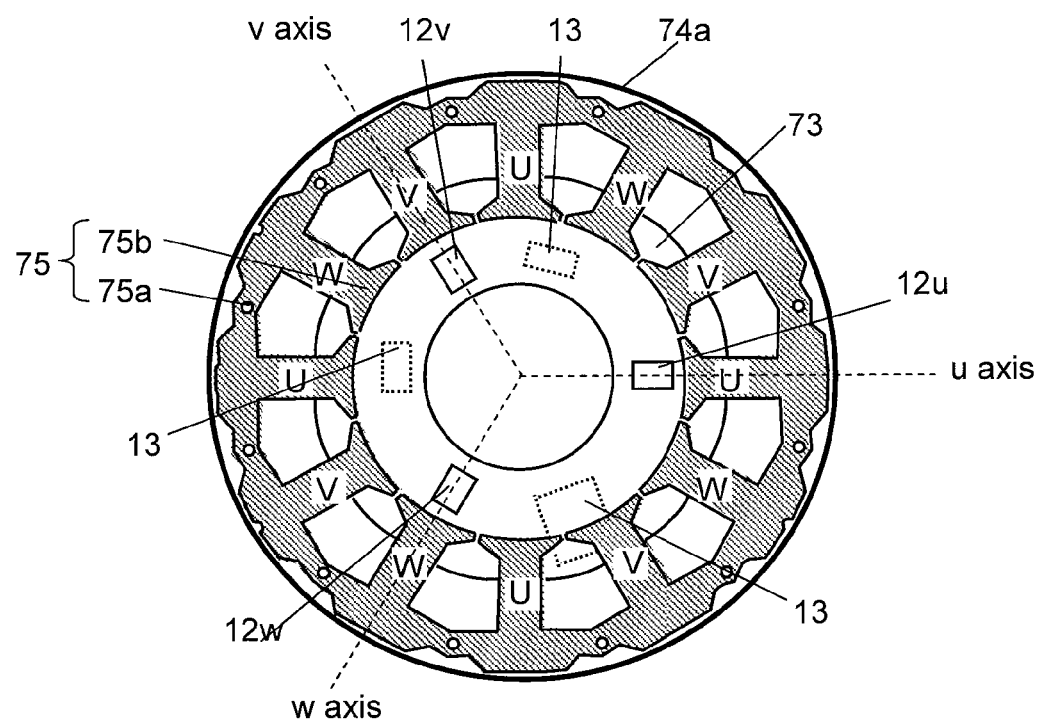
FIG. 14 is a diagram showing the inside of the brushless motor viewed from the top.
Figure 15:
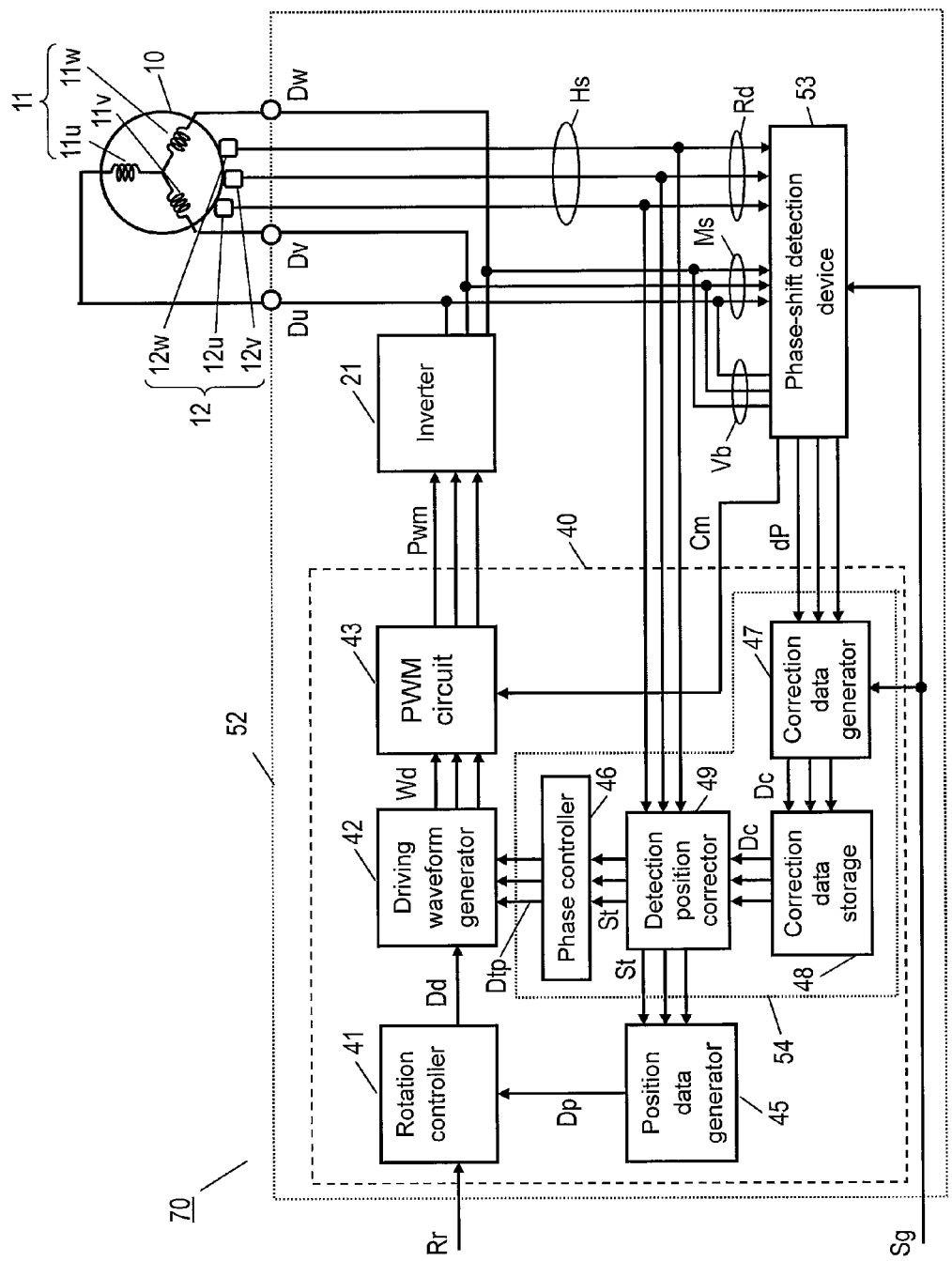
FIG. 15 is a block diagram of the brushless motor in accordance with the sixth exemplary embodiment of the present invention.

FIG. 12 is diagram showing a sectional structure of brushless motor 70 that includes a motor drive device in accordance with the sixth exemplary embodiment of the present invention. FIG. 13 and FIG. 14 are diagrams each showing the inside of brushless motor 70 viewed from the top. FIG. 15 is a block diagram of brushless motor 70 that includes a motor drive device in accordance with the sixth exemplary embodiment of the present invention. In this exemplary embodiment, a description is provided for the detailed configuration of brushless motor 70, using an example of the motor drive device that includes a phase-shift detection device for detecting the respective phase shifts in three phases. The elements similar to those in FIG. 10 have the same reference marks and the descriptions of those elements are omitted. In this exemplary embodiment, a description is provided for an inner rotor type brushless motor, as an example, where a rotor is rotatably disposed on the inner circumferential side of a stator.

As shown in FIG. 12, brushless motor 70 includes stator 71, rotor 72, circuit board 73, and motor case 74. Motor case 74 is made of a sealed cylindrically-shaped metal. Brushless motor 70 is configured such that such stator 71, rotor 72, and circuit board 73 are housed in such motor case 74. Motor case 74 is formed of case body 74a and case cover 74b, and substantially sealed motor case 74 is made by fitting case cover 74b onto case body 74a.

With reference to FIG. 12, in stator 71, windings 11 in the respective phases are wound on stator iron core 75. Also in this exemplary embodiment, a description is provided for an example where windings 11 divided into three phases, i.e. the U phase, the V phase, and the W phase, 120 degrees out of phase with each other are wound on stator iron core 75. Stator iron core 75 has a plurality of salient poles protruding on the inner circumferential side. The outer circumferential side of stator iron core 75 is substantially cylindrically-shaped, and the outer circumference is fixed onto case body 74a.

Rotor 72 is disposed inside stator 71 with a gap provided therebetween. Rotor 72 holds cylindrically-shaped permanent magnet 78 along the outer circumference of rotor frame 77, and is rotatably disposed around rotating shaft 76 in the center, which is supported by bearing 79. That is, the tip surfaces of the salient poles of stator iron core 75 face the outer circumferential surface of permanent magnet 78.

Further, in brushless motor 70, motor case 74 houses circuit board 73 having various circuit components 13 mounted thereon. These circuit components 13 form motor drive device 52 shown in FIG. 15. On circuit board 73, position sensors 12 including Hall elements are also mounted in order to detect the rotation position of rotor 72. Support member 81 is attached to stator iron core 75, and circuit board 73 is fixed in motor case 74 via support member 81. The ends of windings 11 in the respective U phase, V phase, and W phase are lead out from stator 71 as lead wires 11a, and respective lead wires 11a are connected to circuit board 73.

In order to form such a configuration, stator 71 is inserted into case body 74a and fixed to the inside of case body 74a. Next, after rotor 72 and circuit board 73 are housed in case body 74a, case cover 74b is fixed onto case body 74a. With this procedure, brushless motor 70 that includes position sensors 12 and motor drive device 52 is formed. Thus, brushless motor 70 is configured such that motor 10 including stator 71 and rotor 72 is combined with position sensors 12 and motor drive device 52.

FIG. 13 and FIG. 14 are diagrams each showing the inside of brushless motor 70 viewed from the top. Each of FIG. 13 and FIG. 14 shows stator iron core 75 without windings 11 wound thereon. FIG. 13 shows the positional relation between stator iron core 75 and permanent magnet 78. FIG. 14 shows the positional relation between stator iron core 75 and circuit board 73.

As shown in FIG. 13, stator iron core 75 is formed of annular yoke 75a and respective teeth 75b as salient poles. This exemplary embodiment shows an example of 12 teeth 75b that have 12 salient poles. The outer circumference of such stator iron core 75 is fixed onto the inside of case body 74a. Respective teeth 75b extend and protrude toward the inner circumferential side, and are disposed at equal intervals in the circumferential direction while forming slots, which are spaces between teeth 75b. Each of teeth 75b corresponds to one of the U phase, V phase, and W phase in order. U-phase windings 11u are wound on U-phase teeth 75b, V-phase windings 11v are wound on V-phase teeth 75b, and W-phase windings 11w are wound on W-phase teeth 75b.

Rotor 72 is disposed on the inner circumferential side so as to face the tip parts of 12 teeth 75b. Permanent magnet 78 held by rotor 72 is magnetized at equal intervals in the circumferential direction such that S-poles and N-poles are arranged alternately. Permanent magnet 78 in this exemplary embodiment is magnetized such that four pairs each made of an S-pole and an N-pole, i.e. eight poles in the circumferential direction, are arranged. As described above, brushless motor 70 is configured to have 8 poles and 12 slots.

Next, as shown in FIG. 14, position sensors 12u, 12v, and 12w are mounted on circuit board 73 together with various circuit components 13. Position sensors 12u, 12v, and 12w are disposed on circuit board 73 so as to face one end surface of cylindrically-shaped permanent magnet 78. On circuit board 73, position sensors 12u, 12v, and 12w are arranged in the extending directions of teeth 75b in the U phase, V phase, and W phase, respectively. With this arrangement, position sensors 12u, 12v, and 12w detect the magnetic poles of permanent magnet 78 so as to correspond to the U phase, the V phase, and the W phase.

In the configuration of 8 poles and 12 slots in this exemplary embodiment, though a detailed description is omitted, the following operation is performed. When position sensors 12u, 12v, and 12w are arranged at intervals of 120 degrees in mechanical angle, position sensors 12u, 12v, and 12w can supply sensor signals Hs in the U phase, V phase, and W phase 120 degrees in electrical angle out of phase with each other. That is, as shown in FIG. 14, position sensor 12u faces U-phase tooth 75b along the u axis, position sensor 12v faces V-phase tooth 75b along the v axis, and position sensor 12w faces W-phase tooth 75b along the w axis. With this arrangement, as understood with reference to FIG. 13, position sensors 12u, 12v, and 12w are disposed 120 degrees in electrical angle out of phase with respect to magnetic poles of permanent magnet 78. Thereby, position sensors 12u, 12v, and 12w can detect the rotation positions in the U phase, V phase, and W phase, respectively.

When a power-supply voltage or a control signal is supplied from the outside to brushless motor 70 thus configured, the drive control circuit and the inverter on circuit board 73 cause a drive current to flow through windings 11 and a magnetic field is generated from stator iron core 75. The magnetic field from stator iron core 75 and the magnetic field from permanent magnet 78 generate attractive force and repulsive force in response to the polarities of these magnetic fields, and such force rotates rotor 72 around rotating shaft 76 in the center.

Next, a description is provided for position sensors 12 and motor drive device 52 mounted on circuit board 73.

As shown in FIG. 15, motor drive device 52 includes drive control circuit 40, inverter 21, and phase-shift detection device 53. In order to detect respective phase shifts in the three phases, phase-shift detection device 53 applies bias voltage Vb to drive output ends Du, Dv, and Dw, and generates measurement signals Ms corresponding to the phases from the induced voltages generated at respective drive output ends Du, Dv, and Dw. Similarly to the first to the fifth exemplary embodiments, phase-shift detection device 53 generates level difference data dL, using measurement signals Ms and position detection signals Rd, generates phase-shift data dP from level difference data dL, and supplies the data to drive control circuit 40.

As shown in FIG. 15, drive control circuit 40 has rotation controller 41, driving waveform generator 42, PWM circuit 43, position data generator 45, phase controller 46, correction data generator 47, correction data storage 48, and detection position corrector 49.

Rotation command data Rr supplied from an external pre-stage device, for example, is notified to rotation controller 41. Detection position data Dp generated in position data generator 45 is notified to rotation controller 41. As details are described below, detection position data Dp is basically the data that shows the rotation position of rotor 72 based on sensor signals Hs. Based on rotation command data Rr and detection position data Dp, rotation controller 41 generates rotation control data Dd showing the drive amount of windings 11.

Specifically, when the speed of brushless motor 70 is controlled, rotation controller 41 calculates a speed deviation between rotation command data Rr showing the speed command and the detection speed data calculated from detection position data Dp by differential operation, for example. Rotation controller 41 also generates rotation control data Dd showing the amount of torque corresponding to the speed deviation so as to provide an actual speed in accordance with the speed command. When the position of brushless motor 70 is controlled, rotation controller 41 calculates a position deviation between rotation command data Rr showing the position command and detection position data Dp. The rotation controller also generates rotation control data Dd showing the amount of torque corresponding to the position deviation so as to determine the position in accordance with the position command. Rotation controller 41 supplies such rotation control data Dd to driving waveform generator 42.

Driving waveform generator 42 generates waveform signals Wd for driving windings 11 in the respective phases, and supplies generated waveform signals Wd to pulse width modulation (PWM) circuit 43. When windings 11 are driven with sine waves, waveform signals Wd are sine wave signals. When windings 11 are driven with rectangular waves, waveform signals Wd are rectangular wave signals. The amplitude of waveform signals Wd is determined in response to rotation control data Dd. The timings when waveform signals Wd are supplied to PWM circuit 43 are used as reference timings when windings 11 are driven based on waveform signals Wd. These reference timings are determined in response to phase control data Dtp from phase controller 46. The phase in the advance direction of the reference timings is a so-called advance angle, and the phase in the delay direction is a delay angle. With phase-shift detection device 53 configured as described in the fourth exemplary embodiment, the reference timings in the respective phases can be set appropriately so as to reduce distortion in the driving waveforms applied to windings 11 based on waveform signals Wd.

PWM circuit 43 performs pulse width modulation, using waveform signals Wd in the respective phases supplied from driving waveform generator 42 as modulation signals. PWM circuit 43 supplies drive pulse signals Pwm, i.e. pulse train signals obtained by such pulse width modulation using waveform signals Wd, to inverter 21. Further, measurement period signal Cm showing a measurement period is supplied to PWM circuit 43 from phase-shift detection device 53. In response to measurement period signal Cm, PWM circuit 43 stops outputting drive pulse signals Pwm in the period showing the measurement period. Thereby, in the measurement period, energization from inverter 21 to motor 10 is stopped, and phase-shift detection device 53 detects phase shifts using this measurement period.

In response to drive pulse signals Pwm, inverter 21 drives windings 11 by energizing windings 11 in the respective phases. Since drive pulse signal Pwm is a pulse width modulation signal of waveform signal Wd, each winding 11 is energized by drive current corresponding to waveform signal Wd by setting corresponding switching elements to ON or OFF in this manner.

The above configuration forms a feedback control loop for controlling the rotation speed and the rotation position of rotor 72 in accordance with rotation command data Rr.

Next, a description is provided for a detailed configuration for generating detection position data Dp and phase control data Dtp. Particularly, brushless motor 70 has phase-shift detection device 53 and also the function of correcting the detection position in order to compensate for the effect on position detection exerted by misaligned mounting positions of position sensors 12*u*, 12*v*, and 12*w* on circuit board 73 or misaligned installation position of circuit board 73 in case body 74*a*.

First, phase-shift data dP generated in phase-shift detection device 53 is supplied to correction data generator 47. In this exemplary embodiment, generation instruction signal Sg for instructing generation of correction data Dc is notified from an external pre-stage device, for example, to phase-shift detection device 53 and to correction data generator 47. When phase-shift detection device 53 is instructed to generate correction data Dc in response to generation instruction signal Sg, the phase-shift detection device outputs measurement period signal Cm showing a measurement period, generates phase-shift data dP, and supplies the data to correction data generator 47. In order to compensate for the effect on the position detection exerted by the misalignment of position sensors 12, for example, correction data generator 47 generates correction data Dc using phase-shift data dP. Correction data generator 47 stores generated correction data Dc into correction data storage 48.

Detection position corrector 49 generates correction position signals St that show the detection positions corrected, using sensor signals Hs supplied from position sensors 12 and correction data Dc stored in correction data storage 48. That is, detection position corrector 49 corrects three respective sensor signals Hs supplied from position sensors 12 such that the signals are based on the timings corresponding to correction data Dc, and outputs correction position signals St generated by this correction. Correction position signals St are supplied to position data generator 45 and to phase controller 46.

Position data generator 45 generates detection position data Dp, using three correction position signals St. Position data generator 45 supplies thus generated detection position data Dp to rotation controller 41.

At the timings of correction position signals St, phase controller 46 generates phase control data Dtp to be supplied to driving waveform generator 42. That is, driving waveform generator 42 supplies waveform signals Wd to PWM circuit 43, at the timings based on the corrected detection positions. Thus, motor 10 is driven at timings when phase shifts are corrected.

Correction data generator 47, detection position corrector 49, and phase controller 46 form drive phase corrector 54 for correcting phase shifts in motor driving, based on the amounts of phase shifts calculated in phase-shift calculator 33 in phase-shift detection device 53.

As described above, brushless motor 70 is rotary-driven based on the detection positions in which the misalignments of position sensors 12 are corrected.

Next, a description is provided for the detailed operation of generating such correction data Dc and correction position signals St.

Figure 16:
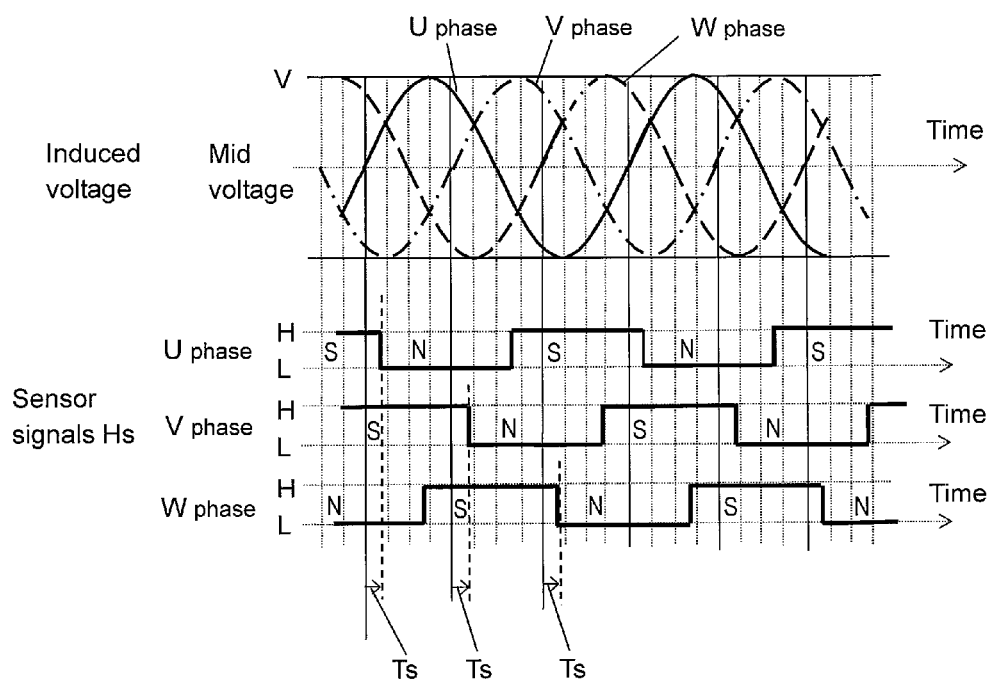
FIG. 16 is a chart showing timings of induced voltages and sensor signals when each position sensor of the brushless motor is disposed in a normal state and the rotor rotates in a non-driving state in accordance with the sixth exemplary embodiment.

FIG. 16 is a chart showing timings of induced voltages and sensor signals Hs when each position sensor 12 is disposed in a normal state and rotor 72 rotates in a non-driving state. When each position sensor 12 is disposed in a normal state, stator 71 and position sensors 12 have the positional relation as shown in FIG. 14. The top waveforms in FIG. 16 show an example of waveforms of induced voltages in the U phase, V phase, and W phase generated at drive output ends Du, Dv, and Dw, respectively, under such a condition. The bottom waveforms in FIG. 16 show an example of waveforms of sensor signals Hs in the U phase, V phase, and W phase.

As described above, when rotor 72 rotates in a non-driving state, this rotation changes the magnetic pole of permanent magnet 78 and generates induced voltages in windings 11. The phases of the induced voltages correspond to the position of stator iron core 75 and the rotation position of permanent magnet 78. The top waveforms in FIG. 16 show such induced voltages.

In contrast, the phases of sensor signals Hs correspond to the positions of respective sensors 12 and the rotation position of permanent magnet 78. Thus, when the magnetic pole of permanent magnet 78 is changed by rotation, position sensors 12 output pulse-shaped sensor signals Hs as shown in FIG. 16. FIG. 16 shows an example of outputting the H level when position sensor 12 detects an S-pole of permanent magnet 78, and outputting the L level when the position sensor detects an N-pole. Here, it is understood that a pattern is formed by combining the levels in the U phase, V phase, and W phase, and six patterns are repeated as one cycle. That is, using these six patterns, the position can be detected with a resolution such that the length of the arc made of a pair of an N-pole and an S-pole of permanent magnet 78 is divided into six parts. Based on such a principle, position data generator 45 generates detection position data Dp. Further, the rising timing or the falling timing of each sensor signal Hs shown in FIG. 16 is used as a reference timing when winding 11 is driven as described above. Specifically, as described below, the timing obtained by correcting the timing of sensor signal Hs, i.e. the timing based on correction position signal St, is used as the reference timing.

When each position sensor 12 is disposed in a normal position with respect to stator iron core 75, at a predetermined number of rotations used as a reference, for example, the phase of induced voltage and the phase of corresponding sensor signal Hs have a constant relation. FIG. 16 shows an example where the phase of the falling edge of sensor signal Hs is time Ts delayed by the delay in a circuit component, for example, with respect to the phase at the timing when corresponding induced voltage zero-crosses at the mid voltage thereof.

Next, a description is provided for the case where position sensor 12 is misaligned.

Figure 17:
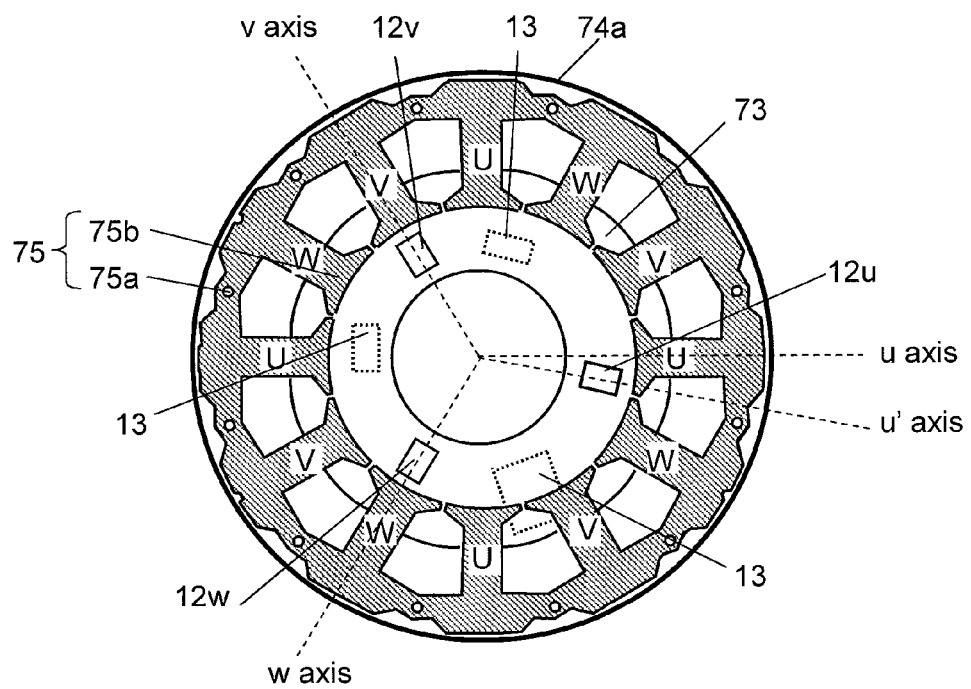
FIG. 17 is diagram showing an example where a misalignment occurs in a mounting position of a position sensor in the brushless motor in accordance with the sixth exemplary embodiment.

FIG. 17 shows an example where position sensor 12*u* mounted on circuit board 73 is misaligned as an example of such misalignment. This example shows that position sensor 12*u* is misaligned from normal u axis to u' axis.

Figure 18:
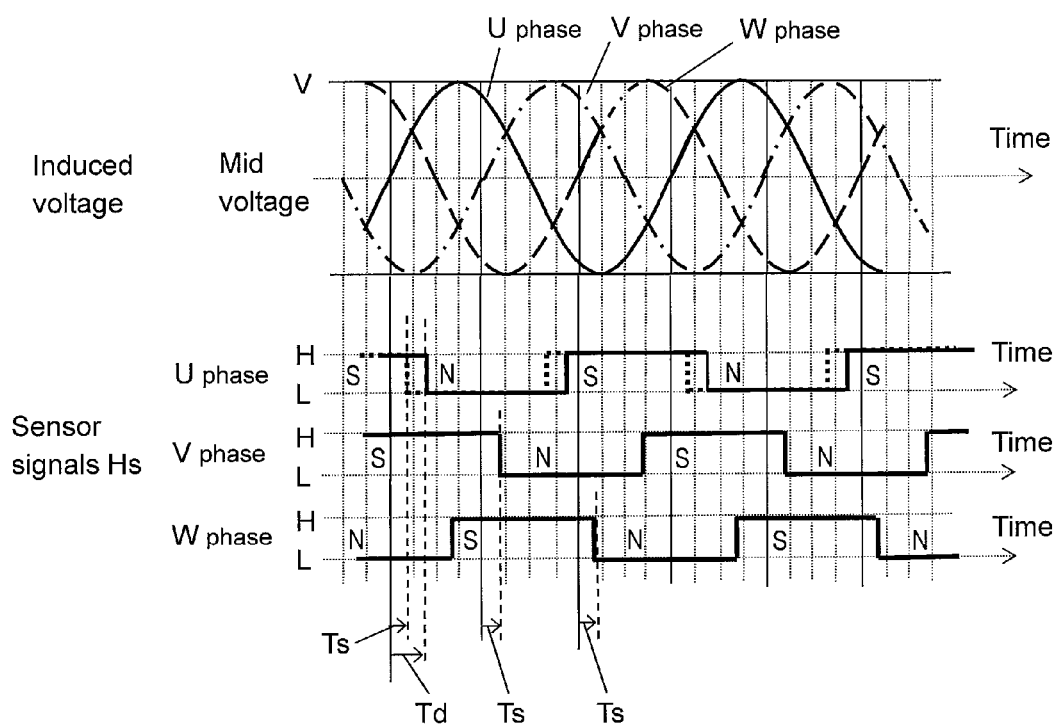
FIG. 18 is a chart showing timings of induced voltages and sensor signals when a misalignment occurs in a mounting position of a position sensor in the brushless motor and the rotor rotates in a non-driving state in accordance with the sixth exemplary embodiment.

FIG. 18 is a chart showing timings of induced voltages and sensor signals Hs when position sensor 12*u* is misaligned as shown in FIG. 17 and rotor 72 rotates in a non-driving state. The top waveforms in FIG. 18 show an example of waveforms of induced voltages in the U phase, V phase, and W phase. The bottom waveforms in FIG. 18 show an example of waveforms of sensor signals Hs in the U phase, V phase, and W phase. Since the phases of the induced voltages correspond to the position of stator iron core 75 and the rotation position of permanent magnet 78, the induced voltages are not affected by the misalignment of position sensor 12. Thus, the top waveforms in FIG. 18 are identical with the top waveforms in FIG. 16. In contrast, the phases of sensor signals Hs correspond to the positions of respective sensors 12 and the rotation position of permanent magnet 78. Thus, when position sensor 12*u*, for example, is misaligned, the phase of sensor signal Hs in the U phase shifts by time Td with respect to the phase of the induced voltage. That is, in the case of the U phase in FIG. 18, the phase is further delayed by phase (Td−

Ts) from normal phase difference Ts with respect to the induced voltage. Thus, it is understood that the misalignment of position sensor 12 corresponds to the phase difference between the induced voltage and sensor signal Hs.

Also phase-shift data dP output from phase-shift detection device 53 is generated based on the phase difference between the induced voltages and sensor signals Hs. The amounts of phase shifts shown by phase-shift data dP are corrected such that the data shows normal phases. This can provide correction position signals St, as sensor signals in which the effect of the misalignment of position sensors 12 is suppressed.

FIG. 17 and FIG. 18 show an example where one position sensor 12u mounted on circuit board 73 is misaligned. However, when the installation position of support member 81 on circuit board 73 is misaligned, the phases of sensor signals Hs in the U phase, V phase, and W phase in FIG. 18, for example, are delayed by time Td. Inversely, when the installation position is misaligned in the opposite direction, the phases are advanced.

In order to correct phase shifts of sensor signals Hs caused by the misaligned mounting position of position sensors 12 or the misaligned installation position of circuit board 73 as described above, when correction data generator 47 is instructed to generate correction data in response to generation instruction signal Sg, the correction data generator generates correction data Dc for correcting phase shifts based on phase-shift data dP and stores the correction data into correction data storage 48. Using such correction data Dc, detection position corrector 49 corrects the phases of sensor signals Hs, and outputs correction position signals St. Using correction position signals St, position data generator 45 generates detection position data Dp. Phase controller 46 supplies phase control data Dtp generated based on the timings of correction position signals St to driving waveform generator 42. Thereby, windings 11 are driven at the timings based on the corrected sensor signals.

In this exemplary embodiment, brushless motor 70 is configured so as to include phase-shift detection device 53 that uses a method similar to that of the first exemplary embodiment, the second exemplary embodiment, the third exemplary embodiment, the fourth exemplary embodiment, or the fifth exemplary embodiment. Thus, brushless motor 70 can accurately detect the misalignment of position sensor 12, if such a misalignment is present, and precisely suppress the effect of the misalignment of the position detection sensor, such as reduction in torque caused by the misalignment, with a simple configuration.

Further, as described in the fifth exemplary embodiment, measurement periods are set from time points before the rising timings and the falling timings of position detection signal Rd to time points after the rising timings and the falling timings. Thereby, the misalignment can be detected while motor 10 is rotary-driven. Thus, for example, correction data Dc can be generated at the timing before shipment of brushless motor 70 and the data may be stored as reference correction data. Further, the phase-shift detection period as shown in FIG. 11 can be set at the startup or during the operation of the motor such that correction data Dc is generated. That is, in the configuration of this exemplary embodiment, correction data Dc can be generated in stand-alone brushless motor 70. Thus, even if the mounting position of position sensor 12 or the position of circuit board 73 with respect to stator iron core 75 are misaligned by age deterioration, for example, such misalignment can be corrected.

Seventh Exemplary Embodiment

Figure 19:
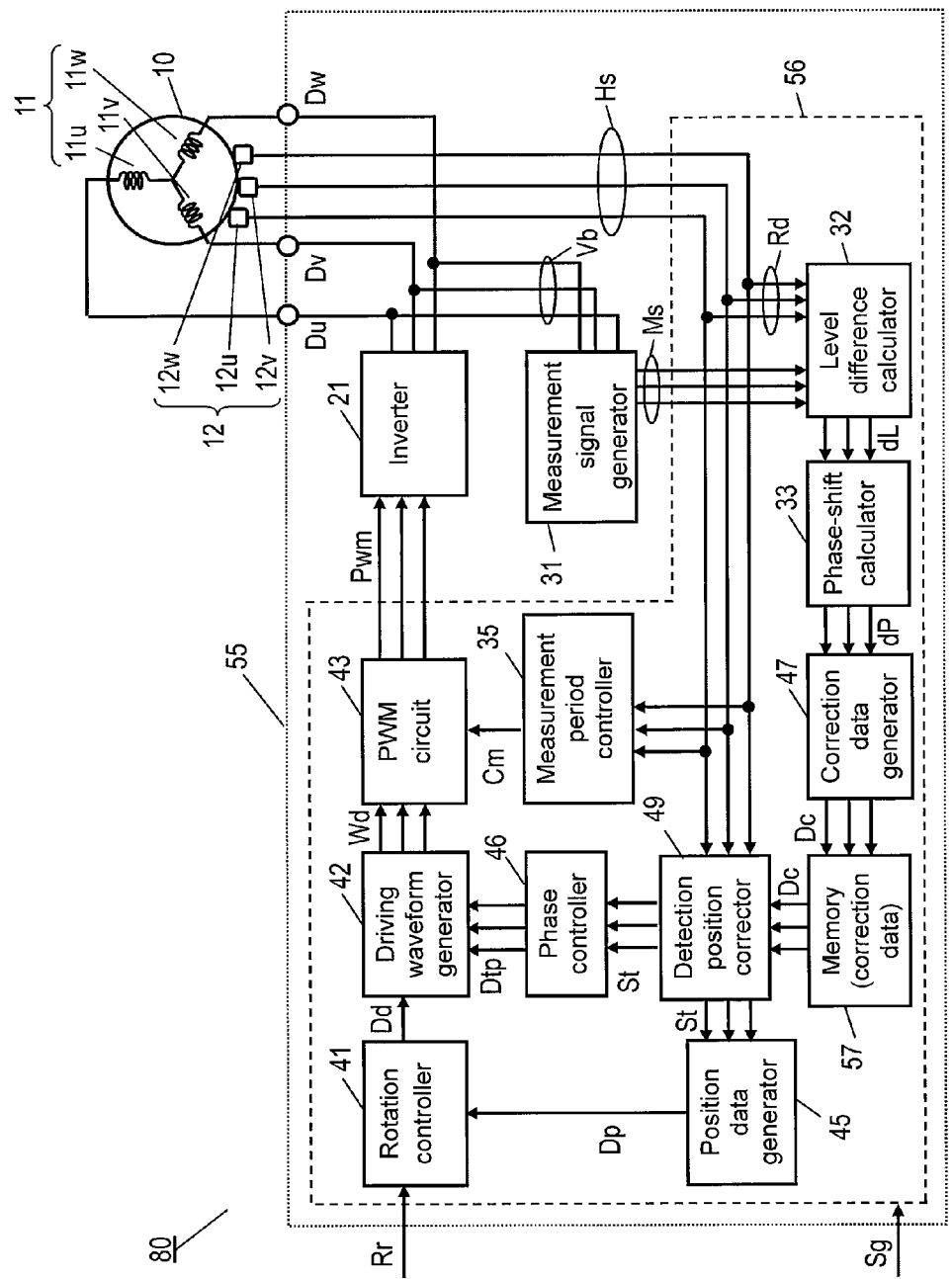
FIG. 19 is a block diagram of a brushless motor that includes a phase-shift detection device in accordance with a seventh exemplary embodiment of the present invention.

FIG. 19 is a block diagram of brushless motor 80 that includes motor drive device 55 in accordance with the seventh exemplary embodiment of the present invention. In comparison with brushless motor 70 shown in FIG. 15, in brushless motor 80 in this exemplary embodiment, the respective parts for control or arithmetic processing are formed of microcomputers (hereinafter, referred to as "micon") 56. That is, the programs stored in a memory, for example, are read and performed by micon 56 so as to implement the functions of the drive control circuit and the functions of the phase-shift detection device in the sixth exemplary embodiment. The drive control circuit includes rotation controller 41, driving waveform generator 42, PWM circuit 43, position data generator 45, phase controller 46, correction data generator 47, and detection position corrector 49. The phase-shift detection device includes level difference calculator 32, phase-shift calculator 33, and measurement period controller 35. Correction data Dc is stored in memory 57 in micon 56. The configuration of brushless motor 80 is similar to that of the sixth exemplary embodiment. The elements denoted with the reference marks same as those in the first to sixth exemplary embodiments have similar functions. Further, such micon 56 is mounted on circuit board 73 as one of circuit components 13, and such circuit board 73 is housed in motor case 74.

Further, in this exemplary embodiment, an A/D converter built in micon 56 acquires the levels of measurement signal Ms and converts the levels to level data. With this configuration, the A/D converter directly observes the levels of measurement signal Ms based on induced voltages. Thus, this configuration is not affected by the delay caused by hysteresis, and allows accurate detection of phase shifts.

Figure 20:
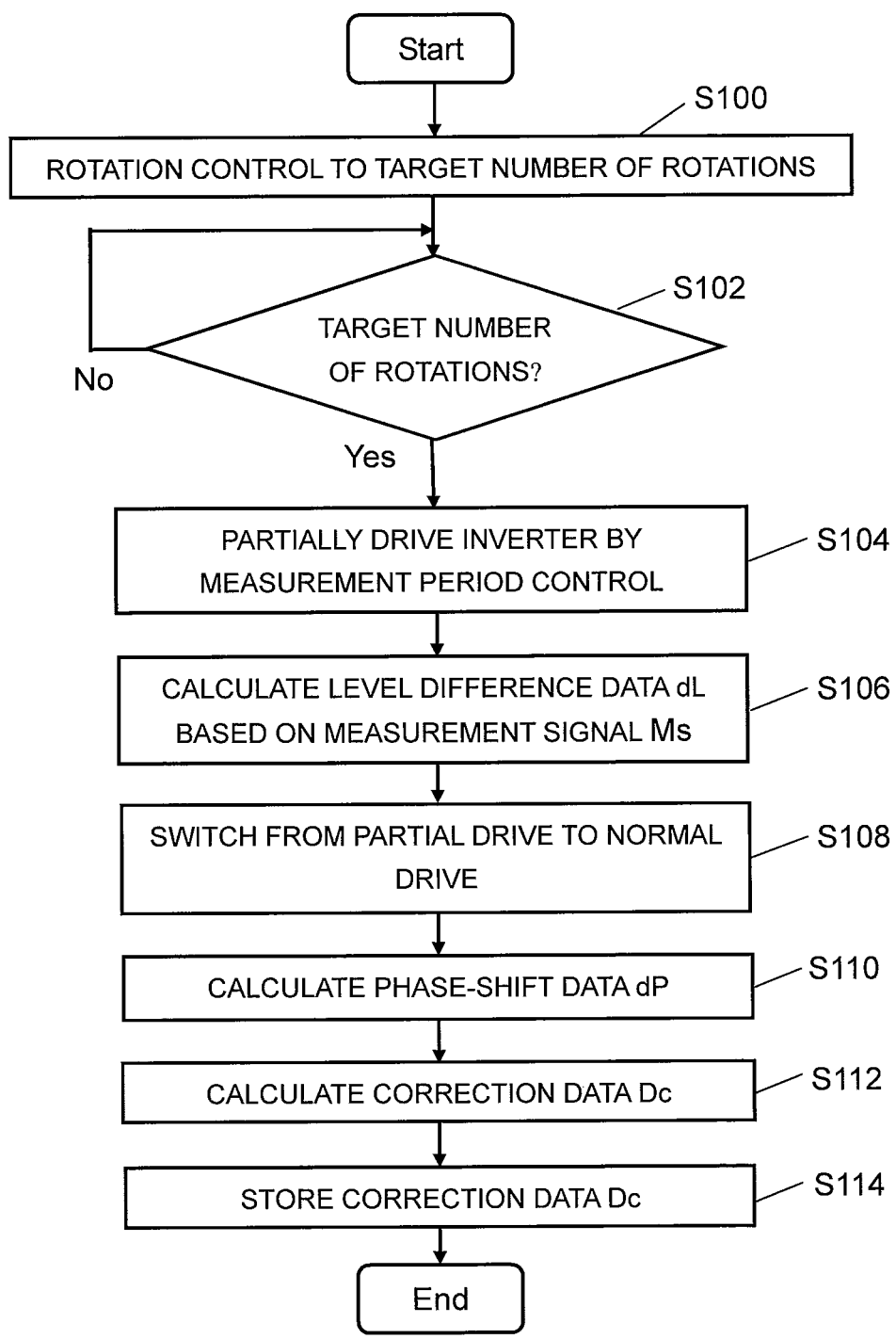
FIG. 20 is a flowchart showing steps of generating correction data in the brushless motor in accordance with the seventh exemplary embodiment.

FIG. 20 is a flowchart showing an example of steps of generating correction data Dc in brushless motor 80 in accordance with this exemplary embodiment. Upon receipt of generation instruction signal Sg for instructing generation of correction data Dc from an external pre-stage device, for example, micon 56 starts processing of generating correction data Dc in the steps shown in FIG. 20. Hereinafter, a description is provided for the processing in FIG. 20 to be performed by micon 56, using the functional blocks shown in FIG. 19.

When micon 56 starts the processing of generating correction data Dc, first, rotation controller 41 controls rotation such that rotor 72 rotates at a target number of rotations (step S100). Measurement period controller 35 measures the number of rotations of rotor 72, using sensor signals Hs. After the number of rotations measured has reached the target number, the next processing is performed (step S102).

That is, after the number of rotations of rotor 72 has reached the target number, measurement period controller 35 generates measurement period signal Cm showing the measurement period, and supplies the signal to PWM circuit 43. In response to measurement period signal Cm, PWM circuit 43 stops outputting drive pulse signals Pwm in the period showing the measurement period. By such measurement period control, inverter 21 is partially driven (step S104). Using this measurement period, micon 56 detects the levels of measurement signal Ms at the rising time and the falling time of sensor signal Hs in each phase through a built-in A/D converter, for example. Level difference calculator 32 calculates level difference data dL (step S106).

Thereafter, measurement period controller 35 switches the inverter from the partial drive to the normal drive (step S108). Since the brushless motor of this exemplary embodiment can be thus controlled, level difference data dL corresponding to phase shifts can be calculated even in motor driving.

Next, in micon 56, phase-shift calculator 33 calculates phase-shift data dP (step S110), correction data generator 47 calculates correction data Dc (step S112), and the calculated correction data Dc is stored in memory 57 (step S114). With such processing performed by micon 56, correction data Dc is generated and stored.

Correction data Dc can be generated by the processing in the above steps. Particularly by the processing in the steps shown in FIG. 20, similarly to the sixth exemplary embodiment, correction data Dc can be generated in stand-alone brushless motor 80. Thus, correction data Dc can be generated not only before shipment of brushless motor 80 but also in the case where brushless motor 80 is incorporated in an electric device, for example. That is, in this exemplary embodiment, for instance, even if the installation position of circuit board 73 is misaligned by vibrations from brushless motor 80 for an extended period of time, the misalignment can be corrected and the effect on the position detection can be compensated for. As the timing of generating such correction data Dc, the data can be generated at the startup of the electric power supply of the electric device incorporating brushless motor 80, or as a part of the periodic inspection of the electric device.

As described above, the phase-shift detection device of the present invention is a phase-shift detection device that detects a phase shift in motor driving, using a pulse-shaped position detection signal and a measurement signal based on the induced voltage from windings. The phase-shift detection device includes a level difference calculator for calculating the level difference between the level of the measurement signal at the rising timing of the position detection signal, and the level of the measurement signal at the falling timing thereof; and a phase-shift calculator for calculating the amount of phase shifts based on the level difference.

This configuration can offer phase-shift information with excellent linearity. Thus, a phase shift in motor driving can be detected accurately with a simple configuration.

In the phase-shift detection device of the present invention, the level difference calculator sets the rising timing and the falling timing of the position detection signal as a reference, and calculates the plurality of level differences at timings before and after the reference. The phase-shift calculator determines the timing when the level difference is zero, using the plurality of level differences, and calculates a phase shift from the timing.

The phase-shift detection device of the present invention further includes an acquisition timing generator for generating the rising timing and the falling timing of the position detection signal, and a timing controller for controlling the timings generated by the acquisition timing generator. The level difference calculator calculates the level difference in the measurement signal acquired at the timings generated by the acquisition timing generator. The timing controller makes control such that the advance or the delay of the phase is detected using the sign of the level difference, and the timings generated by the acquisition timing generator are adjusted in the direction where the level difference is zero. The phase-shift calculator calculates a phase shift from the adjusted timing.

Such a configuration is not affected by the amplitude of induced voltage, and a drive phase shift can be detected accurately with a simple configuration.

The phase-shift detection device of the present invention further includes a measurement signal generator for generating a measurement signal from induced voltage, and the measurement signal generator generates a measurement signal in a sine waveform shape from the induced voltage.

With this configuration, the detected phase shift is based on the level difference in the period during which the amount of change in the sine waveform shape is large, and the level difference changes substantially in proportion to the phase shift. Thus, in addition to a simple configuration, a phase shift in motor driving can be detected accurately.

The phase-shift detection device of the present invention further includes an interphase-shift detector and a phase-shift corrector. When a plurality of magnetic pole position sensors are disposed, the interphase-shift detector detects the amounts of interphase shifts, i.e. interphase shifts between the respective sensor signals, and calculates the average amount of interphase shifts, i.e. the average value of respective interphase shifts detected. The phase-shift corrector corrects the amounts of phase shifts calculated by the phase-shift calculator, using the average amount of interphase shifts, and outputs the corrected results.

With this configuration, each piece of phase-shift data is replaced with a relative error from the average value of phase shifts in sensor signals. Thus, distortion of the driving waveforms can be suppressed.

Further, in the phase-shift detection device of the present invention, measurement periods each having a predetermined period width are set from time points before the rising timings and the falling timings of the position detection signal to time points after the rising timings and the falling timings thereof, and the driving of the motor is stopped only in the measurement periods.

With this configuration, a misalignment can be detected while the motor is rotary-driven. This eliminates the need for setting a special period during which a phase shift is detected. The misalignment caused by age deterioration, for example, can be detected in the state where the motor is incorporated in an electric device.

A motor drive device of the present invention includes the phase-shift detection device, and a drive phase corrector for correcting a phase shift in motor driving based on the amount of phase shifts calculated in the phase-shift calculator.

With this simple configuration, a motor drive device that functions to correct the phase shift in motor driving can be implemented.

A brushless motor of the present invention includes the following elements:

a rotor holding a permanent magnet and disposed rotatably around a rotating shaft in the center;

a stator having a stator iron core, the stator iron core having a plurality of salient poles, each of the salient poles having a winding in a corresponding phase wound thereon; and the motor drive device.

With this simple configuration, a brushless motor that functions to correct a phase shift in motor driving can be implemented.

A phase-shift detection method of the present invention is a phase-shift detection method for detecting a phase shift in motor driving, using a pulse-shaped position detection signal, and a measurement signal based on the induced voltage from windings.

The phase-shift detection method includes the following steps:

calculating a level difference between the level of the measurement signal at a rising timing of the position detection signal and the level of the measurement signal at a falling timing thereof; and calculating the amount of phase shifts based on the level difference.

Also this method eliminates the need for detecting the phase of a local minimum value in an induced voltage waveform including the local minimum value, for example. Thus, a phase shift in motor driving can be detected in a simple manner.

In the phase-shift detection method of the present invention, the rising timing and the falling timing of the position detection signal are set as a reference, a plurality of level differences at timings before and after the reference is calculated, the timing when the level difference is zero is determined using the plurality of level differences, and a phase shift from the timing is calculated.

In the phase-shift detection method of the present invention, the advance or the delay of the phase is detected using the sign of the level difference, and the timings of level difference detection are adjusted in the direction where the level difference is zero. Thereby, the timing when the level difference is zero is determined, and a phase shift from the timing is detected.

Such a method is also not affected by the amplitude of induced voltage, and a drive phase shift can be detected accurately in a simple manner.

In the phase-shift detection method of the present invention, the measurement signal is a signal in a sine waveform shape generated from the induced voltage.

Also with this method, the detected phase shift is based on the level difference in the period during which the amount of change in the sine waveform shape is large, and the level difference changes substantially in proportion to the phase shift. Thus, in addition to a simple configuration, a phase shift in motor driving can be detected accurately.

In the phase-shift detection method of the present invention, the amounts of interphase shifts, i.e. interphase shifts between respective sensor signals, are detected, the amount of phase shifts in motor driving is corrected using the average value of the respective amounts of interphase shifts detected, and the corrected results are output.

Also with this method, each piece of phase-shift data is replaced with a relative error from the average value of phase shifts in sensor signals. Thus, distortion of the driving waveforms can be suppressed.

In the phase-shift detection method of the present invention, measurement periods each having a predetermined period width are set from time points before the rising timings and the falling timings of the position detection signal to time points after the rising timings and the falling timings, and the driving of the motor is stopped in the measurement periods.

Also with this method, a misalignment can be detected while the motor is rotary-driven. This eliminates the need for setting a special period during which a phase shift is detected. The misalignment caused by age deterioration, for example, can be detected in the state where the motor is incorporated in an electric device.

As described above, the phase-shift detection device of the present invention does not need to detect the phase of a local minimum value, and detects a phase shift using the level difference between two points in the induced voltage in a sine waveform. Thus, even if a position detection sensor is misaligned, the misalignment can be detected accurately with a simple configuration. Since the motor drive device and the brushless motor of the present invention include the phase-shift detection device, a misalignment can be corrected accurately with a simple configuration. Also the phase-shift detection method of the present invention does not need to detect the phase of a local minimum value and detects a phase shift using the level difference between two points in the induced voltage in a sine waveform. Thus, if a position detection sensor is misaligned, the misalignment can be detected accurately with a simple configuration.

In the present invention, the level of the induced voltage is directly observed by an A/D converter. Thus, a phase shift can be detected accurately without being affected by the delay caused by hysteresis.

INDUSTRIAL APPLICABILITY

The phase-shift detection device and the phase-shift detection method of the present invention can accurately detect a phase shift in motor driving. The motor drive device and the brushless motor can accurately correct the phase shift in motor driving with a simple configuration. Thus, the present invention is useful for motors used in home electronics appliances or electrical car equipment, where high output, high efficiency, and low noise are necessary.

The invention claimed is:

1. A phase-shift detection device for detecting a phase shift caused by misalignment in rotational position detection of a motor that comprises:
   a rotor and multi-phase drive coils; and
   magnetic pole position sensors, corresponding in number to the multi-phase drive coils, configured to detect positions of rotating magnetic poles of the rotor,
   the phase-shift detection device comprising:
   a measurement signal generator configured to output a sinusoidal measurement signal induced in one of the multi-phase drive coils during rotation of the rotor in a non-driving state;
   a level difference calculator configured to receive a pulse-shaped position detection signal formed based on a sensor signal from one of the magnetic pole position sensors and calculate a level difference between a level of the sinusoidal measurement signal measured at a rising timing of the pulse-shaped position detection signal and a level of the sinusoidal measurement signal measured at a falling timing thereof; and
   a phase-shift calculator configured to calculate a degree of the phase shift, based on the level difference from the level difference calculator.

2. The phase-shift detection device of claim 1, wherein the level difference calculator is configured to calculate a series of level differences $(L(h(i))-L(t(i)))$, where
   (a) i is an integer from 1 through n,
   (b) $h(1) \ldots h(i) \ldots h(n)$ represent a series of equally intervalled timings, and timing $h(i)$ has a relative time interval from the rising timing of the pulse-shaped position detection signal,
   (c) $t(1) \ldots t(i) \ldots t(n)$ represent a series of similarly intervalled timings, and timing $t(i)$ has the same relative time interval from the falling timing of the pulse-shaped position detection signal,
   (d) $L(h(i))$ represents a level of the sinusoidal measurement signal measured at timing $h(i)$, and
   (e) $L(t(i))$ represents a level of the sinusoidal measurement signal measured at timing $t(i)$, and
   the phase-shift calculator is configured to determine a timing at which the level difference is zero, using the series of level differences, and calculate the degree of the phase shift based on the timing at which the level difference is zero.

3. The phase-shift detection device of claim 1, further comprising:
   an acquisition timing generator configured to generate the rising timing and the falling timing of the pulse-shaped position detection signal; and
   a timing controller configured to control the timings generated by the acquisition timing generator, wherein the level difference calculator calculates the level difference in the sinusoidal measurement signal acquired at the timings generated by the acquisition timing generator, the timing controller controls such that an advance or a delay of the phase is detected using a sign of the level difference, and the timings generated by the acquisition timing generator are adjusted in a direction causing the level difference to be zero, and the phase-shift calculator calculates the degree of the phase shift, based on the adjusted timing.

4. The phase-shift detection device of claim 3, wherein the acquisition timing generator, the level difference calculator and the timing controller perform a feedback loop for adjusting the timing generated by the acquisition timing generator so that the level difference becomes zero.

5. The phase-shift detection device of claim 1, wherein the multi-phase drive coils are three-phase drive coils, and the measurement signal generator includes a bias circuit for applying a bias voltage to one of the three-phase drive coils and outputs an induced voltage produced from another of the three-phase drive coils as the sinusoidal measurement signal.

6. The phase-shift detection device of claim 1, wherein the multi-phase drive coils are three-phase drive coils, and the measurement signal generator includes a bias circuit for applying bias voltages, respectively, to the three-phase coils, and outputs induced voltages produced from the three-phase drive coils as the sinusoidal measurement signals.

7. The phase-shift detection device of claim 1, further comprising:

an interphase-shift detector configured to detect degrees of interphase shifts between every combination of two of the sensor signals, and calculate an average of the detected degrees of the interphase shifts; and a phase-shift corrector configured to correct the degree of phase shift calculated by the phase-shift calculator, using the average degree of the interphase shifts, and outputting the corrected results.

8. The phase-shift detection device of claim 1, wherein measurement periods each having a predetermined period width are set from time points before the rising timing and the falling timing of the pulse-shaped position detection signal to time points after the rising timing and the falling timing thereof, and driving of the motor is stopped to be set in the non-driving state in the measurement periods.

9. The phase-shift detection device of claim 8, wherein a drive phase in which the motor is driven is corrected, using the detected degrees of phase shifts, and an operation of detecting a phase shift is repeated.

10. A motor drive device for driving a motor having a rotor and multi-phase drive coils, comprising:

the phase-shift detection device of claim 1;

an inverter configured to energize and drive the multi-phase drive coils; and a drive phase corrector configured to correct the phase shift caused by misalignment in rotational position detection in motor driving based on the degree of phase shift calculated in the respective phases.

11. The motor drive device of claim 10, wherein the multi-phase drive coils are three-phase drive coils, the phase-shift calculator calculates the degree of the phase shift in the respective phases, and the drive phase corrector corrects the phase shift in the respective phases, based on the degree of phase shift in the respective phases.

12. The motor drive device of claim 10, wherein the drive phase corrector corrects timings of the sensor signals produced by the magnetic pole position sensors.

13. The motor drive device of claim 12, further comprising:

a driving waveform generator configured to generate a waveform signal, the waveform signal driving each of the multi-phase drive coils;

a PWM circuit configured to generate a drive pulse signal obtained by pulse width modulation using the waveform signal; and an inverter configured to energize the multi-phase drive coils, based on the drive pulse signals, wherein the waveform signal generated by the driving waveform generator is output to the PWM circuit at a timing of a correction position signal corrected in the drive phase corrector.

14. A brushless motor comprising:

a rotor holding a permanent magnet and disposed for rotation with a rotating shaft in a center;

a stator including a stator iron core that has a plurality of salient poles and multi-phase drive coils being wound one the salient poles; and the motor drive device of claim 10.

15. A phase-shift detection method for detecting a phase shift caused by misalignment in rotational position detection in motor driving of a motor that comprises:

a rotor and multi-phase drive coils; and magnetic pole position sensors, corresponding in number to the multi-phase drive coils, configured to detect positions of rotating magnetic poles of the rotor, the method comprising:

measuring a sinusoidal measurement signal induced in one of the multi-phase coils in a non-driving state;

calculating a level difference between a level of the sinusoidal measurement signal measured at a rising timing of a pulse-shaped position detection signal formed based on a sensor signal from one of the magnetic pole position sensors and a level of the measurement signal measured at a falling timing thereof; and calculating a degree of phase shift based on the level difference from the level difference calculator.

16. The phase-shift detection method of claim 15, wherein calculating a level difference comprises calculating a series of level differences $(L(h(i))-L(t(i)))$, where (a) i is an integer from 1 through n, (b) $h(1) \ldots h(i) \ldots h(n)$ represent a series of equally intervalled timings, and timing $h(i)$ has a relative time interval from the rising timing of the pulse-shaped position detection signal, (c) $t(1) \ldots t(i) \ldots t(n)$ represent a series of similarly intervalled timings, and timing $t(i)$ has the same relative time interval from the falling timing of the pulse-shaped position detection signal, (d) $L(h(i))$ represents a level of the sinusoidal measurement signal measured at timing $h(i)$, and (e) $L(t(i))$ represents a level of the sinusoidal measurement signal measured at timing $t(i)$, and determining a timing at which the level difference is zero, using the series of level differences, and calculating the degree of the phase shift based on the timing at which the level difference is zero.

17. The phase-shift detection method of claim 15, further comprising:

a timing at which the level difference is zero is determined by detecting an advance or a delay of the phase using a sign of the level difference, and adjusting the timings of level difference detection in a direction causing the level difference to be zero, and the degree of phase shift from the timing is calculated.

18. The phase-shift detection method of claim 17, wherein the timing at which the level difference is zero is determined by forming a feedback loop for adjusting the timings of level difference detection in a direction causing the level difference to be zero.

19. The phase-shift detection method of claim 15, wherein the multi-phase coils are three-phase coils, a bias voltage is applied to one of the three-phase drive coils, and an induced voltage produced from another of the three-phase drive coils is measured as the measurement signal.

20. The phase-shift detection method of claim 15, wherein the multi-phase coils are three-phase coils, bias voltages are applied, respectively, to the three-phase drive coils, and induced voltages produced from the three-phase drive coils are measured as the measurement signals.

21. The phase-shift detection method of claim 15, wherein degrees of interphase shifts between every combination of two of the sensor signals are detected, the degree of phase shift in motor driving is corrected using an average of the detected degrees of the interphase shifts, and the corrected results are output.

22. The phase-shift detection method of claim 15, wherein measurement periods each having a predetermined period width are set from time points before the rising timing and the falling timing of the pulse-shaped position detection signal to time points after the rising timing and the falling timing thereof, and driving of the motor is stopped to be set in the non-driving state in the measurement periods.

23. The phase-shift detection method of claim 22, wherein a drive phase in which the motor is driven is corrected, using the detected degrees of phase shifts, and an operation of detecting a phase shift is repeated.

\* \* \* \* \*